United States Patent [19]
Tsuboi et al.

[11] Patent Number: 5,610,678
[45] Date of Patent: Mar. 11, 1997

[54] CAMERA INCLUDING CAMERA BODY AND INDEPENDENT OPTICAL VIEWFINDER

[75] Inventors: Takayuki Tsuboi, Yokohama; Yasuhiro Toyoda, Ohmiya, both of Japan

[73] Assignee: Canon Kabushiki Kaisha, Tokyo, Japan

[21] Appl. No.: 365,682

[22] Filed: Dec. 29, 1994

[30] Foreign Application Priority Data

Dec. 30, 1993 [JP] Japan .................................. 5-350359
Dec. 30, 1993 [JP] Japan .................................. 5-350360

[51] Int. Cl.⁶ ............................................... G03B 13/02
[52] U.S. Cl. .................... 396/373; 348/345; 348/375; 396/378; 396/58
[58] Field of Search ............................ 354/219, 220–226, 354/288; 348/77, 78, 341, 345, 346, 375

[56] References Cited

FOREIGN PATENT DOCUMENTS

| 61-24386 | 2/1986 | Japan . |
| 61-160436 | 10/1986 | Japan ................................. 354/219 |
| 62-271691 | 11/1987 | Japan . |
| 3-289893 | 12/1991 | Japan . |
| 4-86906 | 3/1992 | Japan . |

*Primary Examiner*—D. Rutledge
*Attorney, Agent, or Firm*—Fitzpatrick, Cella, Harper & Scinto

[57] ABSTRACT

An apparatus adapted for use with a camera including a camera body and an independent optical viewfinder. The apparatus includes a following device that drives a photographing field of the camera body to follow a viewfinder field of the optical viewfinder.

36 Claims, 30 Drawing Sheets

CAMERA INCLUDING CAMERA BODY AND INDEPENDENT OPTICAL VIEWFINDER

BACKGROUND OF THE INVENTION

1. Field of the Invention

The present invention relates to a camera that has an independent viewfinder, which is provided separate from the camera, and an electric universal head, which alters the direction in which the camera is aimed.

2. Related Background Art

Conventional cameras, and the prior art that is considered applicable for the control of the cameras, will now be described, relative to the present invention.

1) Generally, a viewfinder for a camera is integrally formed within the body of a camera.

2) In Japanese Laid-open Patent Application No. 3-289893 is disclosed such a technique that a camera is supported by a camera swing driver so as to aim the camera in that direction in which the head of a photographer is directed. The swing driver is attached to the photographer's head using the temples of glasses, or a hat, so that the camera swing driver is driven and swings the camera at a predetermined angle (the angle of the difference between the direction in which a photographer's head is directed and the photographer's line of sight) by the output from a constant head angle detection switch.

3) In Japanese Laid-open Patent Application No. 61-24386 is disclosed a technique that, on the upper portion of an oscillator that is installed in a helmet for an operator, is provided a flat antenna whose output of received electric waves varies in consonance with the movement of the helmet. The head movements of the operator are detected by the reception output of the antenna, and, in consonance with the detection output, control command signals are transmitted that control the direction in which a vision sensor is aimed.

4) In Japanese Laid-open Patent Application No. 62-271691 is disclosed a technique which employs a gyro that is mounted on a helmet of an operator and that detects the angular velocity of the movement of the helmet. The detected angular velocity is employed to calculate a helmet posture. A TV camera control device employs a signal for the helmet posture that varies from time to time to control the posture of a TV camera, and the view or the screen of a monitor TV changes in consonance with the movements of the head of an operator.

5) In Japanese Laid-open Patent Application No. 4-86906 is disclosed a technique that employs output signals, which relay the up-and-down and side-to-side movements of eyeballs, that originate at an eyeball movement detector. The signals are fed to a controller, a controlled value relative to a TV camera is calculated, and a radio signal in consonance with the calculation result is generated and sent to an unmanned vehicle to control the direction in which a TV camera that is installed therein is aimed.

The above prior art items 1) through 5) have the following problems.

In prior art item 1), since a photographer must hold a camera in his hands, near his face, and must look through a viewfinder, which is integrally formed within a camera, to take pictures, the following problems have arisen.

a) As a photographer must hold the above described posture for an extended period while engaged in long-term photography, such as the recording on film of a scene with a video camera, the effort will exhaust the photographer.

b) When a photographer suddenly comes upon a scene that he wants to photograph, he requires so much time to set his camera and get ready to take a picture that he loses the chance to click a shutter.

c) With a still camera held at the ready, the above described posture of a photographer will reveal to a targeted person the photographer's intention to take a photograph, making it difficult for the targeted person to assume a natural pose and preventing a satisfactory photograph from being taken.

d) When a photographer is playing sports or is holding bags in both hands, he cannot set up a camera and get it ready for photographing. Further, when a camera is fixed to a helmet for filming while playing sports, the optical axis of the lens can be adjusted so that it substantially corresponds to the direction in which his face is aimed. However, because the photographer cannot look through a viewfinder, he cannot know the exact range and cannot focus on the target, so that there is a very high possibility that his photograph will not be well composed.

In prior art item 2), a camera must be attached to the head of a photographer so that it is aimed in the direction in which his head is turned, and the following problems have arisen.

a) There is a small degree of freedom at the place of attachment.

b) Since most of the system is supported by the photographer's head and neck, its weight tires the photographer and makes the system inappropriate for long-term filming.

In prior art item 3) the following problem has arisen.

a) As a flat antenna must be provided on the helmet or otherwise attached to the photographer's head, the device is large and not good for portable use, and is inappropriate for outdoor photographing.

In prior art item 4) the following problem has arisen.

a) An eyeball movement detector is required, and when it is installed, its bulk causes the device to become large and complicated.

SUMMARY OF THE INVENTION

It is an aspect of the present invention to provide an apparatus, which is for employment with a camera, that eliminates the necessity for holding a camera and looking through a viewfinder when taking a photograph, and that has a simple arrangement that makes it possible to take a photograph with a camera of the same target that is within the field of an independent viewfinder.

According to one aspect of the present invention, an apparatus is adapted to use for a camera which comprises a linked portion for causing a photographing field of a camera body to follow a viewfinder field of an optical viewfinder that is provided separately from the camera body.

Other aspects of the present invention will be apparent from the detailed description that is given for the following preferred embodiments.

DETAILED DESCRIPTION OF THE PREFERRED EMBODIMENTS

The preferred embodiments of the present invention will now be described while referring to the accompanying drawings.

FIGS. 1 through 10 are diagrams concerning a camera system according to a first embodiment of the present invention. First, the structure of the camera system will be explained while referring to FIGS. 1 through 6.

An independent viewfinder unit 301, which is connected to a camera 302 that includes an electric universal head by a power supply cord 304, is secured to the head of a person by a band 305.

Figure 3:
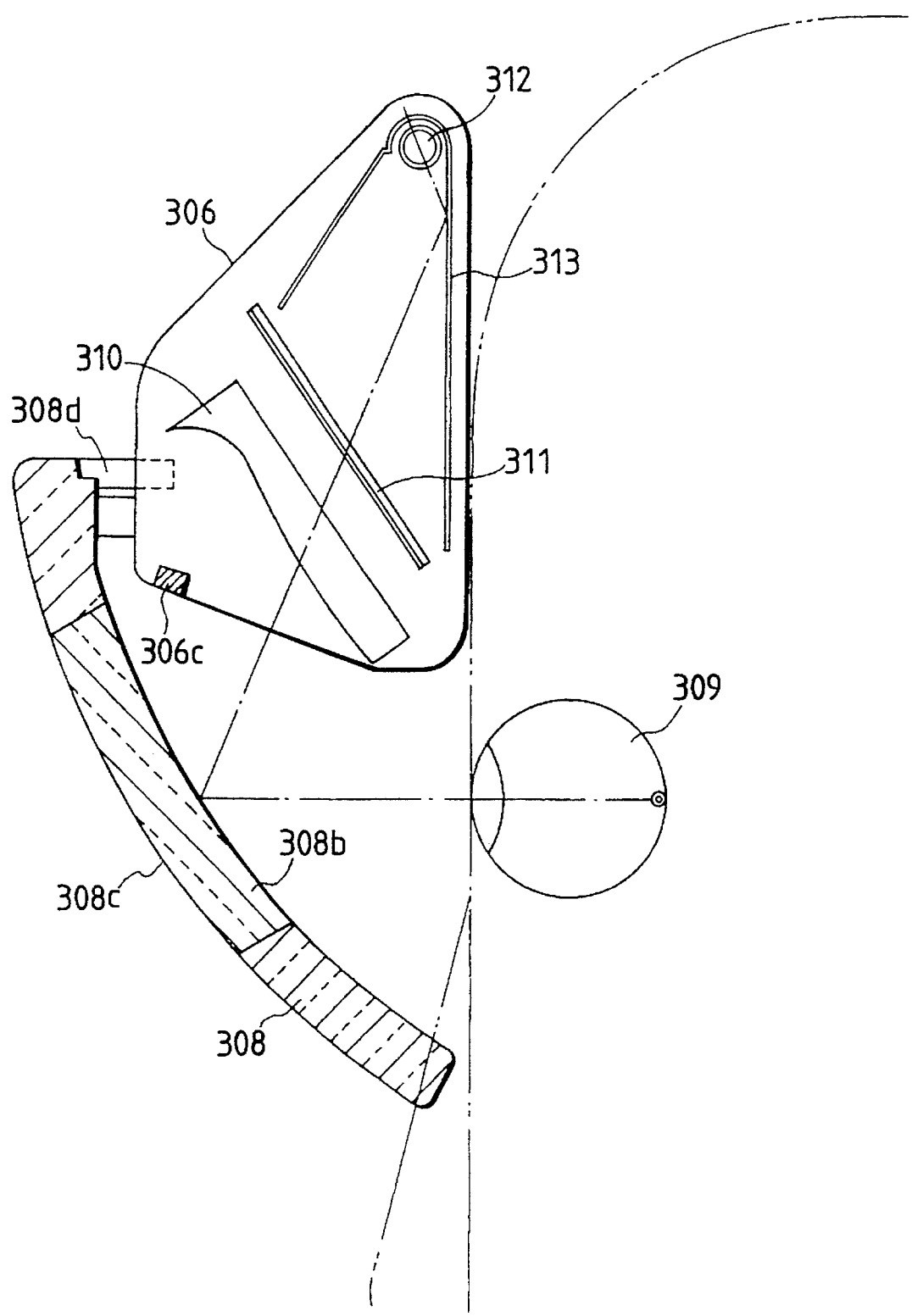
FIG. 3 is a cross sectional view of the structure of an independent viewfinder of a camera system according to the first embodiment.
Figure 4A:
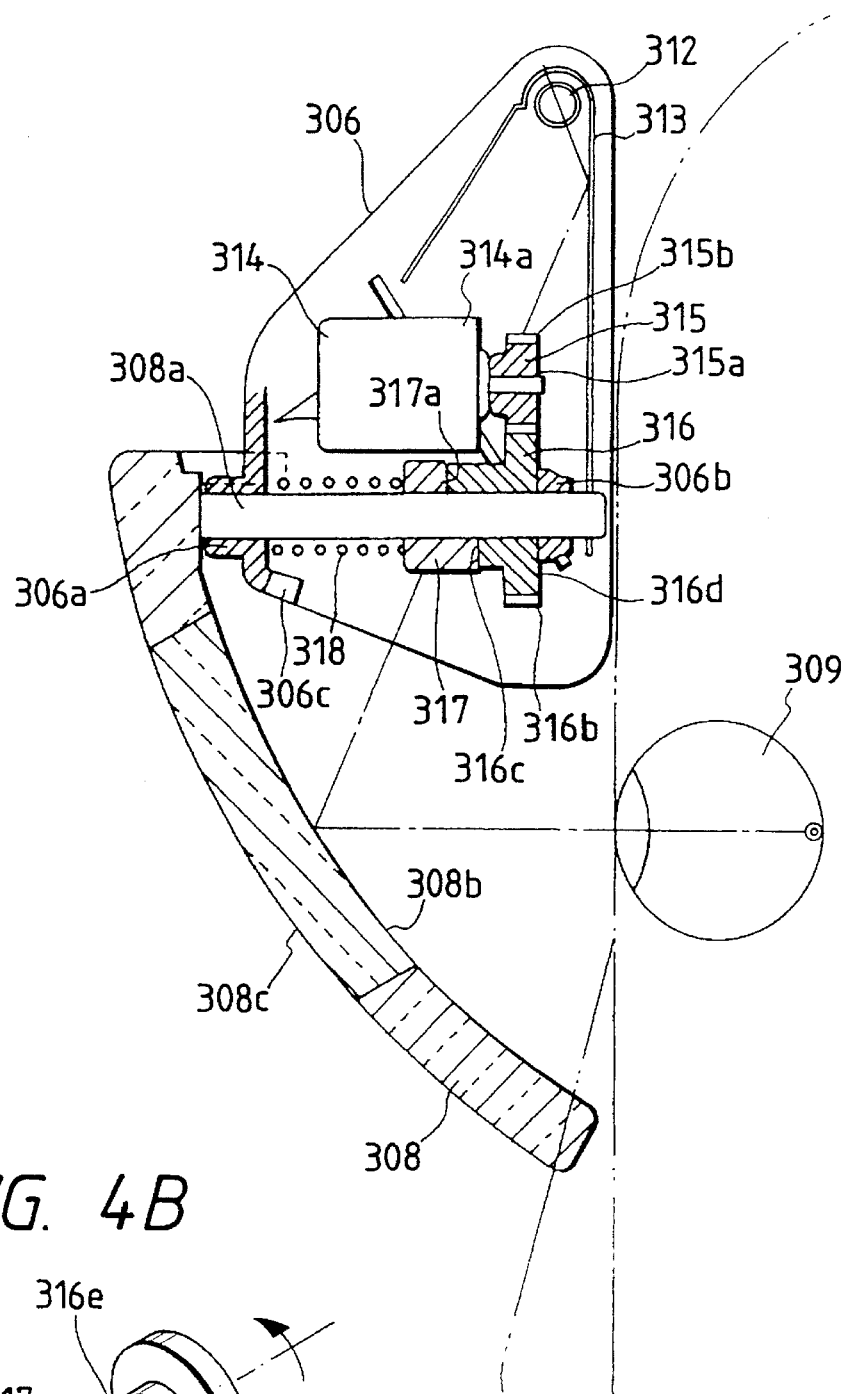
FIGS. 4A and 4B are cross sectional views of the structure of the independent viewfinder of a camera system according to the first embodiment.
Figure 4B:
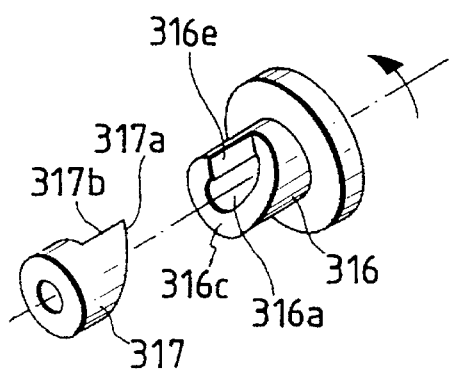
Figure 5:
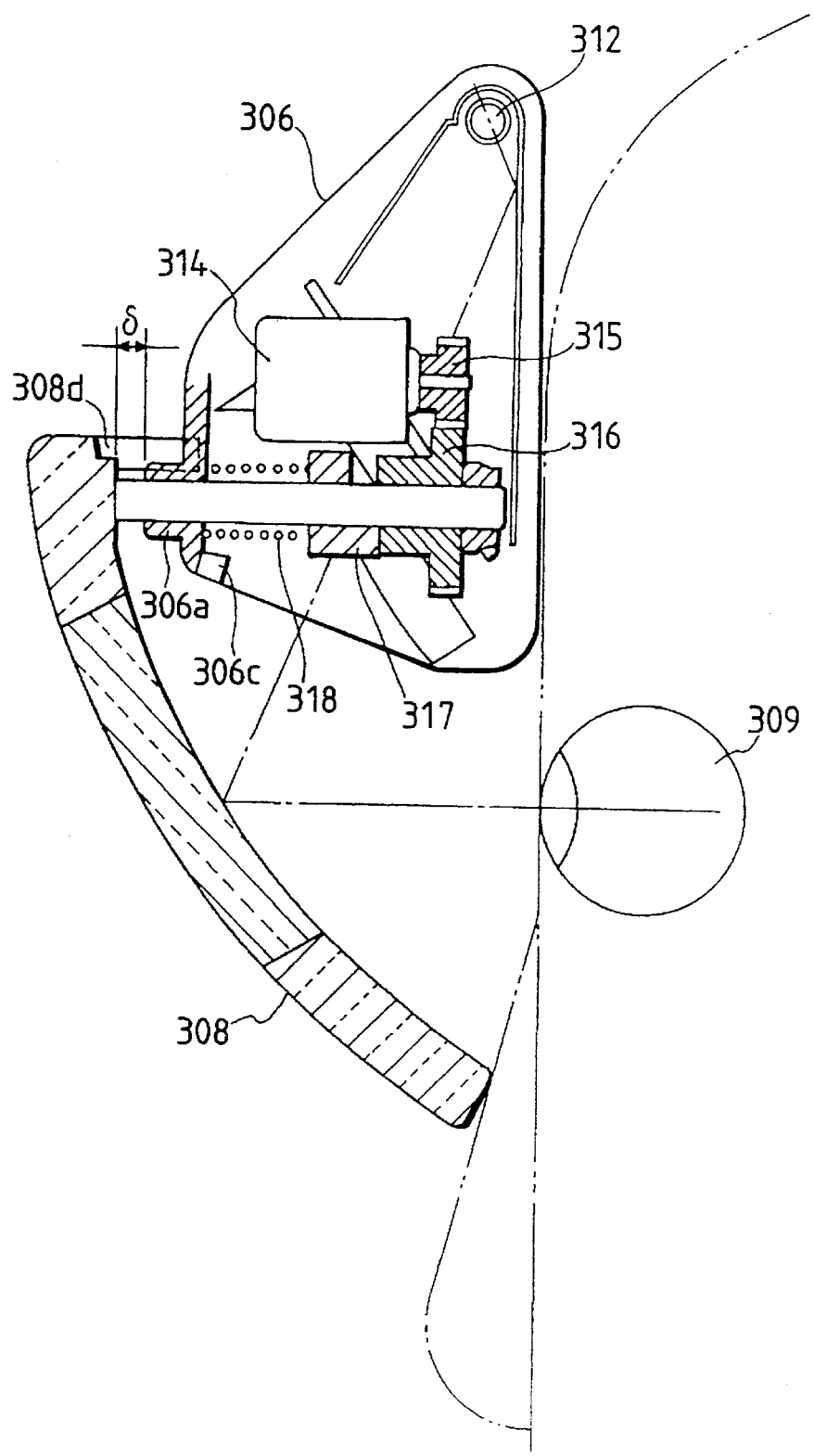
FIG. 5 is a cross sectional view of the structure of the independent viewfinder of a camera system according to the first embodiment.

Independent viewfinder bodies 306 (which will later be described in detail while referring to FIG. 3), which are provided on both sides of a connecting bridge 307 that adjusts and maintains the interval between the viewfinder bodies 306, have glass lenses 308, to each of which is secured a shaft 308a that is supported rotatably by bearings 306a and 306b (see FIGS. 4A and 4B). Three sound generators 306c, which are provided for communication, correspond to three reception sections 321b that are provided within a camera body 321, which will be described later.

Figure 1:
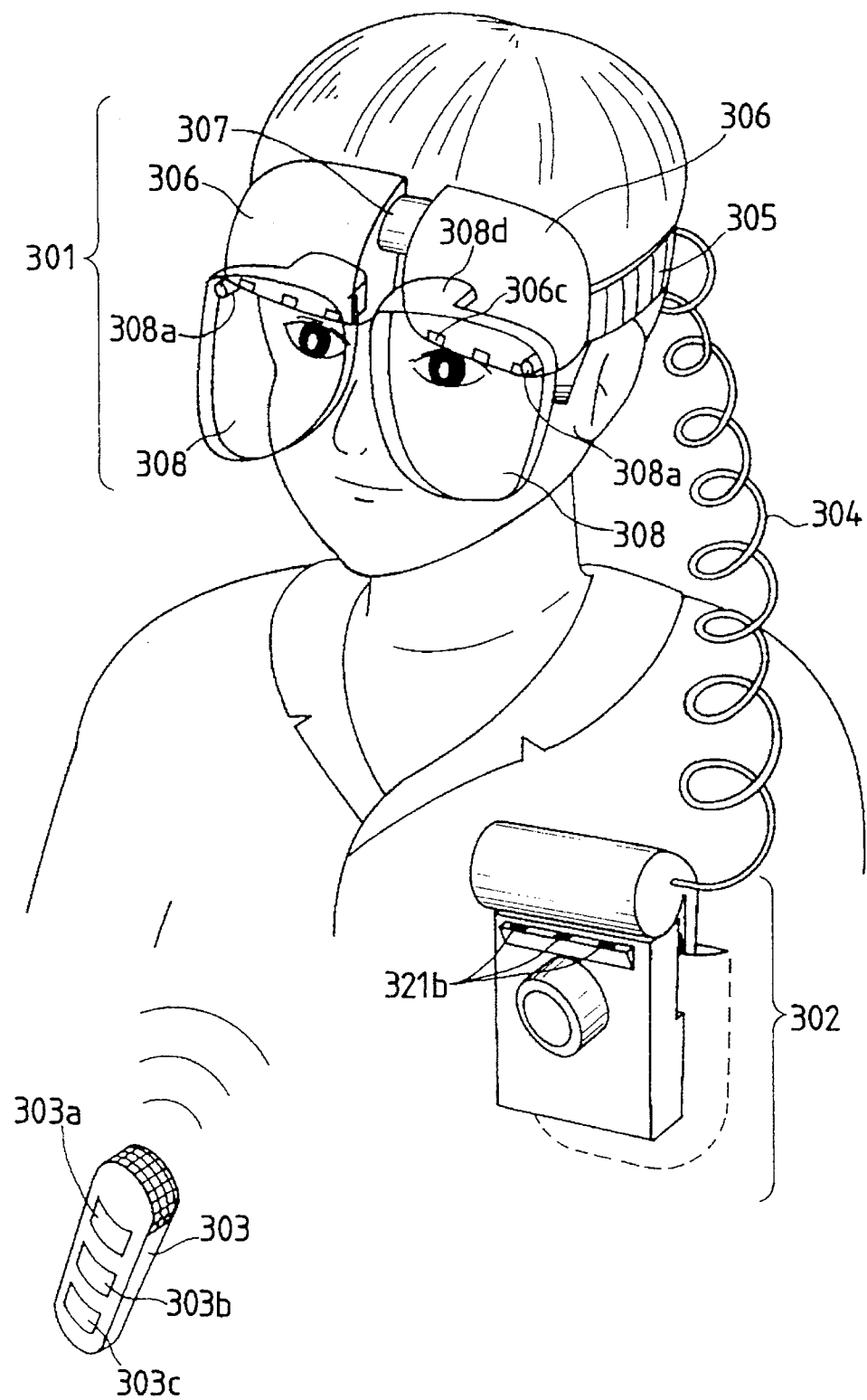
FIG. 1 is a perspective view illustrating a camera system according to a first embodiment of the present invention when glass lenses are advanced within the field of vision.

As is shown in FIG. 3, the glass lens 308 is formed of a mixture of a transparent optical resin, such as polyacrylate or polycarbonate, and a photochromic material (material whose color changes in proportion to the intensity of ultraviolet rays). The volume of light that is transmitted varies in consonance with the external luminance. Half mirror coating is performed on a lens face 308b. The lens faces 308b and 308c, which are formed almost in parallel to each other, provide a meniscus structure that has almost no power (refraction power) with respect to incident light reflected from a view field. A stopper 308d contacts the stage (not shown) of the independent viewfinder body 306 when the swinging glass lens 308 is swung to the view field position that is shown in FIG. 1, and determines the position of the glass lens 308 relative to the direction in which it is swung. The protrusion value is designed to be greater than a diopter control scale δ.

In FIG. 3, reference number 309 denotes a man's eye. The shape of an aspherical eccentric optical lens 310, which is formed of transparent plastic material, in the cross sectional view shown in FIG. 3 is very different from the shape of a cross sectional view that is perpendicular to that cross section. On the retina of the eye 309, the aspherical eccentric optical lens 310 focuses an image held in a field frame that is marked on a mask (or on a liquid crystal display) 311 and that indicates the photographic range of a camera. Since this image is focused via a lens face 308b that is a half mirror, a photographer can view a frame image as a virtual image that is located at a distance of approximately 1 m in the field. This technique is well known as a head-up display in, for example, U.S. Pat. No. 4,026,641, and no explanation for it will be given.

Reference number 312 in FIG. 3 and other drawings denotes a fluorescent tube that illuminates the mask (or the liquid crystal display) 311, and reference number 313 denotes a reflector.

Stepping motors 314 that are shown in FIG. 4A are so supported by their respective means (not shown) in the individual viewfinders 306 that they are able to move symmetrically. A pinion 315 is integrally formed with an output axle 314a of each of the stepping motors 314, and a toothed wheel 315b of the pinion 315 engages teeth 316b of a cam gear 316. The output of the stepping motor 314 is transferred via the pinion 315 to the cam gear 316. The cam gear 316 rotatably retains the shaft 308a, of the glass lens 308, that is inserted into a through hole 316a shown in FIG. 4B, and has a thrust cam face (a cam face that has a lead) 316c.

Figure 2:
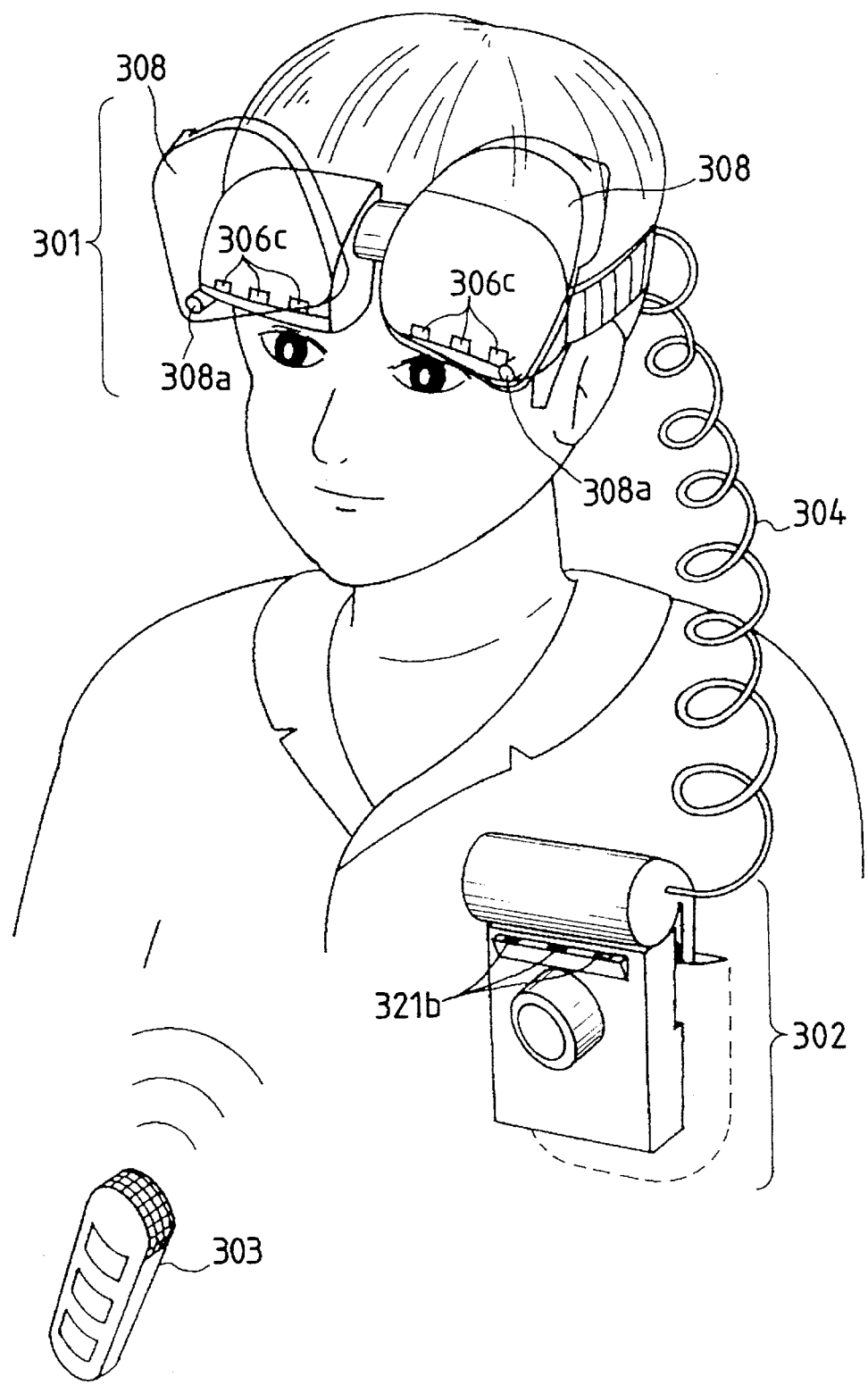
FIG. 2 is a perspective view illustrating the camera system according to the first embodiment of the present invention when the glass lenses are retracted and held at a storage position.

A ring cam 317 that is fitted around the shaft 308a, of the glass lens 308, has a cam face 317a that contacts the cam face 316c of the cam gear 316 that has the same lead. In FIGS. 4A and 4B, the ring cam 317 is driven by a spring 318 so that it pushes the cam gear in the direction that is to right in FIG. 4A, and a receiving face 316d of the cam gear 316 contacts the bearing 306b of the independent viewfinder body 306. In FIG. 2, while the cam faces 316c and 317a are in contact, the glass lenses 308 are further rotated to the storage position, which will be described later.

Under these conditions, when the stepping motor 314 is rotated clockwise, the cam gear 316 and glass lens 308 are rotated together to the view field position shown in FIG. 1, while the cam faces 316c and 317a are held in contact by the force of the spring 318. Then, when the rotation of the cam gear 316 and the glass lens 308 is halted by the stopper 308d abutting upon the frame of the viewfinder body 306, the state is reached that is shown in FIGS. 4A and 4B.

Under these conditions, when the stepping motor 314 continues to rotate clockwise, as is shown in FIG. 4B, the cam gear 316 is rotated counterclockwise and the ring cam 317 and the glass lens 308 are driven by the thrust cam face 316c against the force of the spring 318 so that they move to the left in FIG. 4A. In other words, the glass lens 308 is shifted from the storage position in FIG. 2 to the view field position in FIG. 1, and when it is driven further in the same direction, the diopter of the glass lens 308 is adjusted (a detailed description will be given later). When the stepping motor 314 is in the state shown in FIG. 4A and is rotated counterclockwise, the cam gear 316 rotates clockwise until a level difference portion 316e on the cam gear 316 engages a level difference portion 317b on the ring cam 317. Then the cam gear 316 and the glass lens 308 are rotated together clockwise and the glass lens 308 is thereby retracted from the position that is shown in FIG. 1 to the storage position, as is shown in FIG. 2.

A remote controller 303 includes a calibration switch 303a that is employed to start the diopter scale setting and the field calibration, which will be described later, a release button 303b that, as well as a normal camera release button, enables a half stroke and a full stroke, and an OFF switch 303c that is employed to shift the viewfinder 306 to the retracted position.

Figure 6:
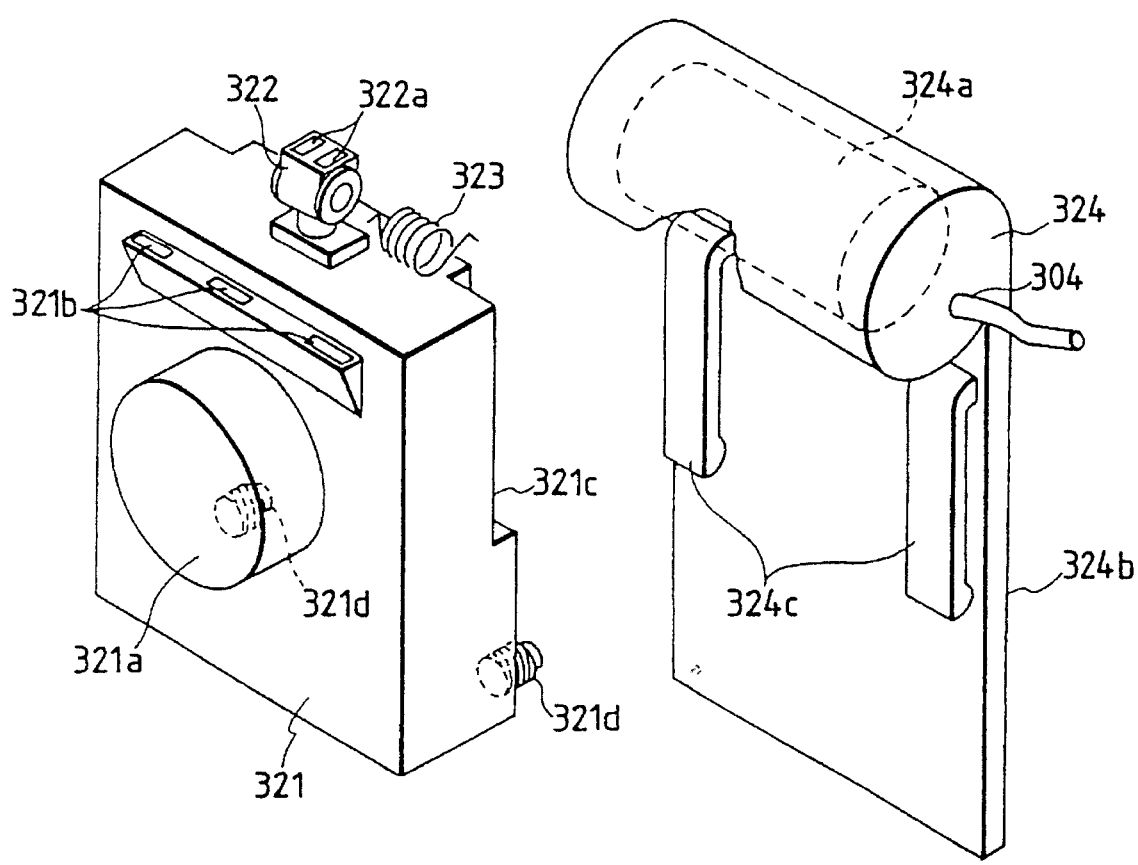
FIG. 6 is a perspective view illustrating the structure of a camera that includes an electric universal head according to the first embodiment.

FIG. 6 is a perspective view of the camera 302 that includes an electric universal head.

In FIG. 6, the camera body 321 with a conventional known circuit arrangement, in which an electric universal head that will be described later is installed, comprises a lens barrel 321a, a reception section (sonar sound collector) 321b, run offs 321c for pen clips 324c of a panel unit 324, which will be described later, and lead screws 321d (which correspond to the electric universal head that will be described later) whose protrusions are controlled by respective incorporated stepping motors 336a and 337a (not shown in FIG. 6), which will be described later.

A universal hinge 322 in FIG. 6 is so designed that it can be rotated along two axes in both X and Y directions, and is so supported by a support mechanism (not shown) that it can be detached from the panel unit 324. A contact element 322a is employed to receive power that is supplied by a lithium sulfur battery 324a.

A torsion spring 323 forces the lead screws 321d to abut upon the panel unit 324 when the camera body 321 is attached to the panel unit 324 as previously described, and serves as one of the functions of the universal head. The panel unit 324 has a lithium sulfur battery (secondary battery) in a portion indicated by the dotted lines and an amorphous solar battery on the reverse of a panel 324b in FIG. 6. When incident external light strikes the solar battery, energy is accumulated by a power source (the lithium sulfur battery 324a).

Further, two power supply lines are provided for the power source; one, which supplies power to the camera body 321, connects a contact element (not shown) of the panel unit 324 to the camera body 321 via the contact element 322a, and the other, which supplies power to the independent viewfinder 306, connects the panel contact element (not shown) to the independent viewfinder 306 via the power supply cord 304.

The pen clips 324c are formed together with the panel unit 324. As is shown in FIG. 1, the pen clips 324c are slipped into a pocket to securely hold the panel unit 324. Further, the pen clips 324c are used to hold the panel unit 324 when the panel unit 324 to a window curtain is removed from the camera body 321, as is shown in FIG. 6, and a solar battery is exposed to sun light to charge the power source.

Figure 7:
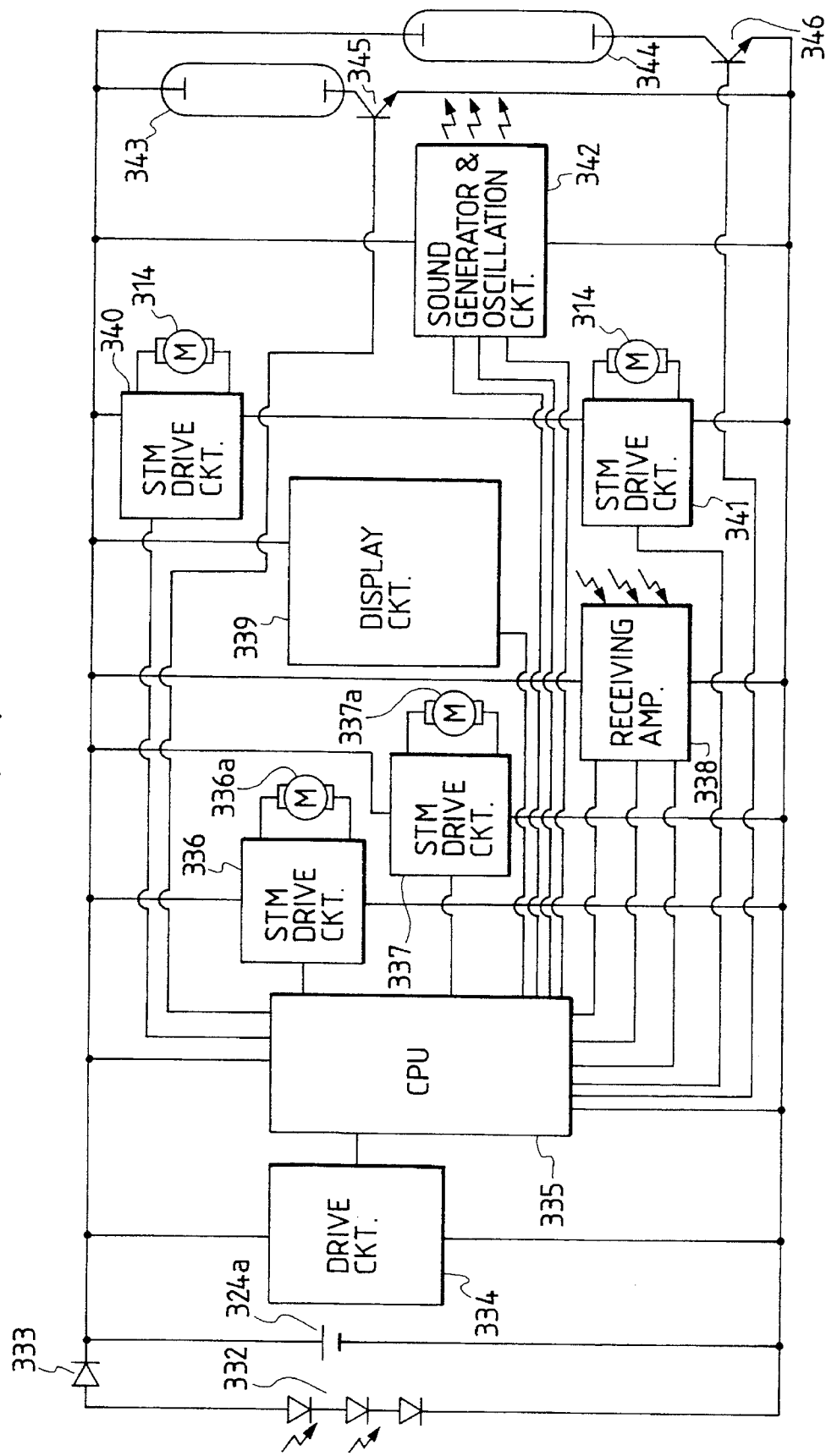
FIG. 7 is a block diagram illustrating the essential arrangement of the camera system according to the first embodiment of the present invention.

FIG. 7 is a block diagram illustrating the schematic electric arrangement of the thus structured camera 302 and the independent viewfinder 306.

In FIG. 7, the lithium-sulfur battery 324a that is shown in FIG. 6 accumulates energy that is generated by a solar battery 332, which is located on the reverse of the panel 324b, and also supplies power to the circuits in the camera, which will be described later. A diode 333 prevents a counter-flow. A drive circuit 334, which is provided in the camera body 321, controls such well known photographic processes as automatic focusing, shutter opening and closing, and automatic winding. A microcomputer (CPU) 335 controls various operations following procedures which will be described later.

STM drive circuits 336 and 337 drive respective STM stepping motor 336a and 337a that project or retract the lead screws 321d. A receiving amplifier 338 includes the reception section (sonar sound collector) 321b of the camera body 321 and an amplifier that amplifies a signal output from the reception section 321b.

A display circuit 339 is used to display alarms. STM drive circuits 340 and 341 drive the respective stepping motors 314 (separate, individual motors are provided for a right and a left eye) in the independent viewfinders 306, as shown in FIG. 4A, that shift the glass lenses 308 from the view field position to the storage position or vice versa, and that perform diopter adjustment. A sound generator & oscillation circuit 342 includes the sound generators 306c (a total of six for both sides), shown in FIG. 1. Fluorescent tubes 343 and 344 (which correspond to the fluorescent tube 312 in FIG. 3) are turned on by the CPU 335 via respective drive transistors 345 and 346.

Figure 8:
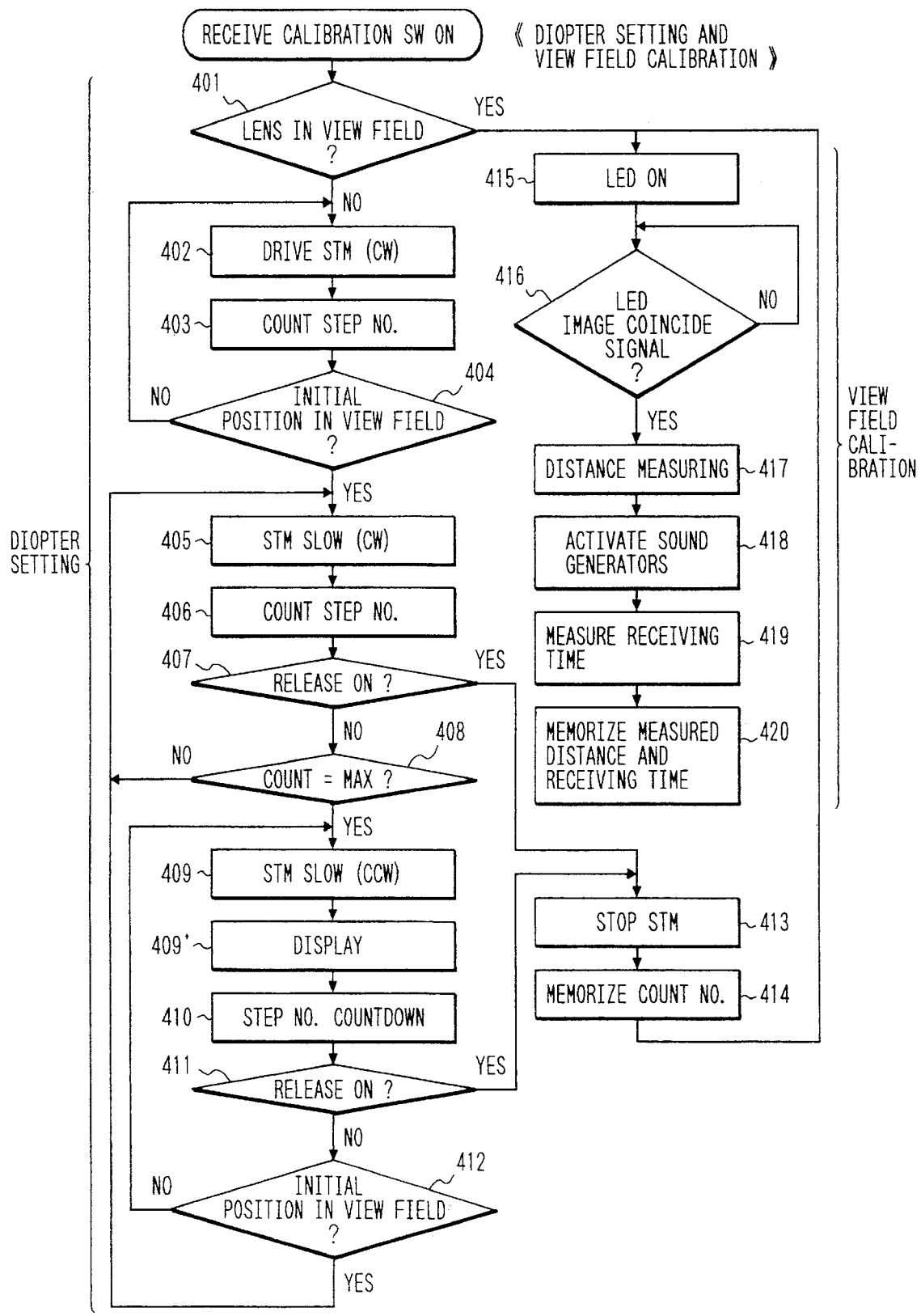
FIG. 8 is a flowchart showing the processing for a microcomputer (CPU) in FIG. 7 of the camera for the setting of a diopter scale and for view field calibration.
Figure 9:
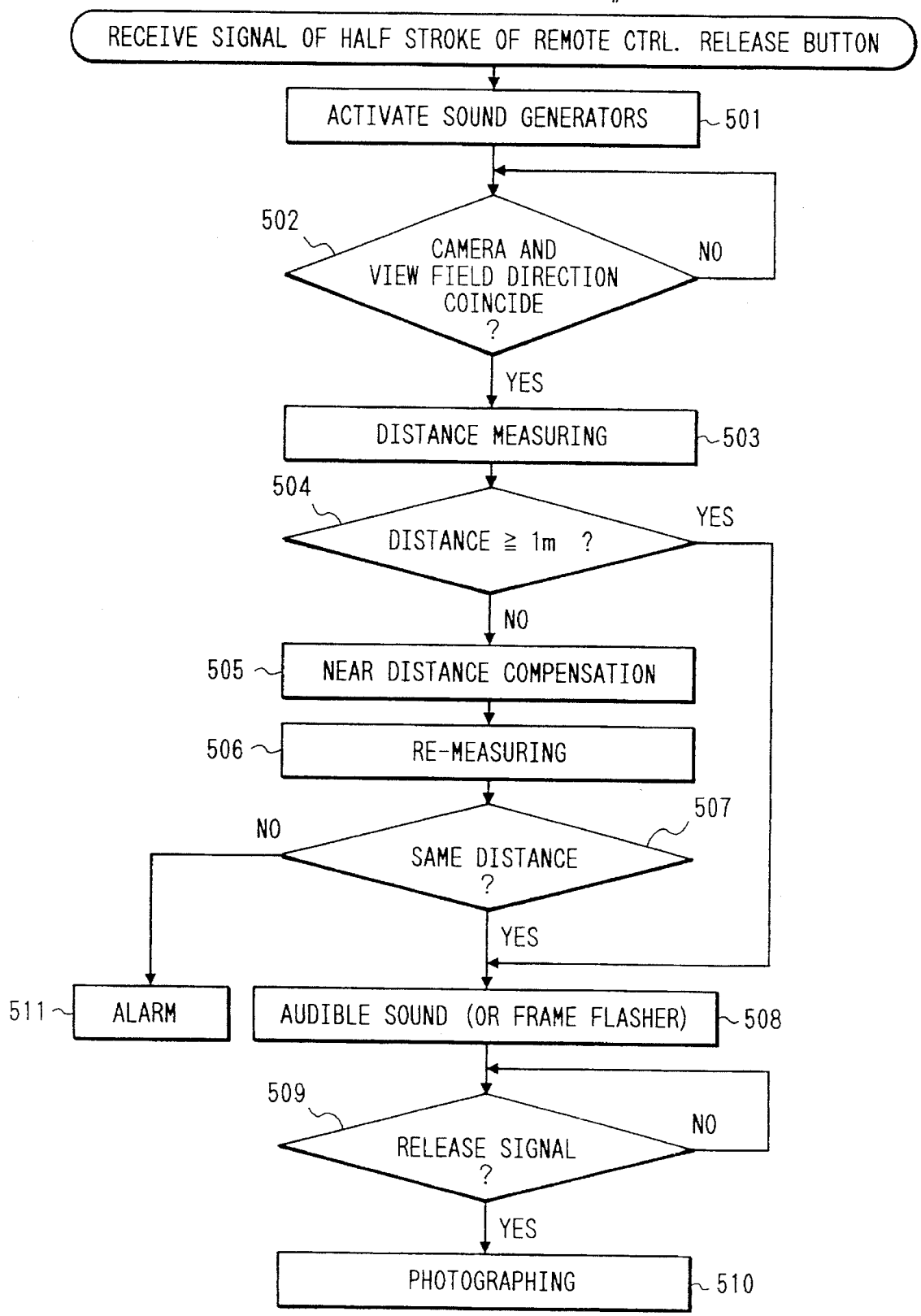
FIG. 9 is a flowchart showing the photographing processing for the camera CPU.
Figure 10:
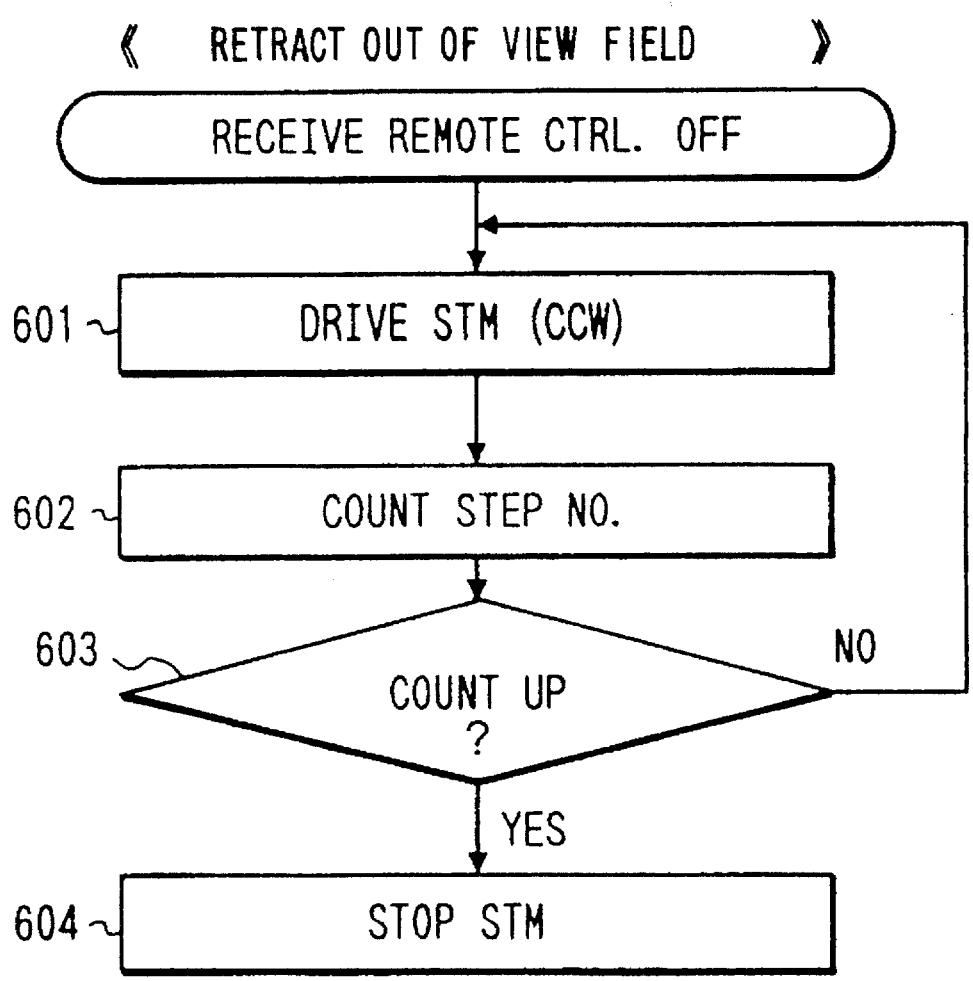
FIG. 10 is a flowchart showing the processing for the camera CPU when the glass lenses are retracted from the view field.

The operations of the CPU 335 will now be explained while referring to the flowcharts in FIGS. 8 through 10.

First, diopter setting and view field calibration will be described while referring to FIG. 8.

A photographer turns on the calibration switch 303a of the remote controller 303 he is holding in his hand, and upon receipt of the signal by the CPU 335, the diopter setting and the view field calibration are begun at step 401.

First, at step 401, a check is performed to determine whether or not the glass lenses 308 are at the storage position or at the view field position. If the glass lenses 308 are already located at the view field position, as is shown in FIG. 1, program control moves directly to step 415 where the view field calibration is begun. If the glass lenses 308 are located at the storage position, as is shown in FIG. 2, program control moves to step 402.

With the premise that the glass lenses 308 are located at the storage position, as is shown in FIG. 2, the processing at step 402 and at the following steps will be explained first. To simplify the explanation, only the driving of the glass lens 308 for the left eye will be described for this embodiment.

At step 402, the stepping motor 314 is rotated clockwise via the STM drive circuit 340 and the shifting of the glass lens 308 to the view field position is begun. The number of steps is counted at step 403, and at step 404, a check is performed to determine whether or not the step number count has reached a predetermined step number that corresponds to the initial position in the view field. Since this system is so designed that the number of steps from the storage position to the view field position is predetermined, if the step number count has not reached the predetermined step number, the glass lens 308 has not reached the initial position in the view field. Program control returns to step 402, and the same processing is repeated.

If, at step 404, the step number count has reached the predetermined step that corresponds to the initial position in the view field, program control goes to step 405 where the stepping motor 314 is now gradually rotated clockwise step by step. This process is performed so that a photographer can more easily adjust the diopter setting, which will subsequently be conducted after the glass lens 308 has reached the initial position in the view field. At step 406, the number of steps is counted in the same manner as was done at step 403.

The photographer turns on the release switch by pressing the release button 303b of the remote controller 303 when the diopter is adjusted. If, at step 407, the CPU 335 receives an ON signal from the release switch, program control moves to step 413. If not, program control moves to step 408.

Although in this embodiment, an ON signal from the release switch that corresponds to a full stroke is received, an ON signal that corresponds to a half stroke may be employed. Further, the ON signal received from the release switch is not employed as a start signal for photographing, but is employed for branching from the diopter setting procedure to the view field calibration procedure. Therefore, the calibration switch 303a may be employed in this case, instead of the release button 303b, and the OFF switch 303c may also be employed.

When at step 407 an ON signal from the release switch has been received, program control branches to step 413, as was previously described. It is assumed that the diopter setting for the glass lens 308 is completed, and the driving by the stepping motor 314 is halted. At step 414, the number of steps that have been counted up to that point in the process is stored. The count of the stored steps provides the step count for driving the stepping motor 314, and returning the glass lens 308 to the original position, when it is necessary to retract the glass lens 308 to the storage position. Of course, this stored step count may also be employed to shift the glass lens 308 to the view field position.

If, at step 407, an ON signal from the release switch has not been received, program control advances to step 408, where a check is performed to determine whether or not the current step count has reached MAX, which is equivalent to the maximum value for shifting. When the step count has not yet reached MAX, program control returns to step 405, and the above processing is repeated until an instruction is issued that the diopter setting has been adjusted (until an ON signal from the release switch has been received).

When the step count has reached MAX, program control advances to step 409, where the stepping motor 314 is slowly driven in the reverse direction. Since the photographer might forget to signal that the diopter adjustment has been completed (by the manipulation of the release button 303b of the remote controller 303), at step 409 an alarm is sounded and a message that the step count has exceeded the diopter adjustment range is displayed on the display circuit 339. Then, the step count is decremented at step 410, and a check is again performed at step 411 to determine whether or not an ON signal from the release switch has been received. When an ON signal from the release switch has been received, program control branches to step 413, where it is assumed that the diopter setting for the glass lens 308 is completed and the driving of the stepping motor 314 is halted. At step 414 the step count up to that point in the process is stored.

When, at step 411, the ON signal from the release switch has not been received, a check is performed at step 412 to determine whether or not the glass lens 308 has been returned to the initial view field position, which is the lowest in the diopter setting range. If the glass lens 308 has not been returned to the initial position, then program control returns to step 409, and the above described process is repeated. If the glass lens 308 has been returned to the initial position, then program control returns to step 405, where the stepping motor 314 is again slowly driven clockwise step by step, and the process following after that step is repeated while waiting for the completion of the diopter setting. In this case, instead of returning to step 405, it may be assumed that there is something wrong with the photographer or the camera and program control may go to an operation inhibit mode. Or after program control returns to step 405 and goes to step 406, 407, 408, 409, 410, 411, and 412, program control may then enter in the operation inhibit mode.

The diopter setting is then terminated. To reexplain this procedure, in outline, when the calibration switch 303a of the remote controller 303 is ON, the glass lens 308, which has a viewfinder function, is advanced to the view field position so as to provide for a photographer the same conditions as when he looks through a viewfinder that is an integrally formed part of a normal camera. At the same time, the diopter is sequentially adjusted so that the photographer can clearly see a target.

Although to simplify the explanation only the diopter setting for the glass lens 308 for the left eye has been described, the diopter setting for the glass lens 308 for the right eye is performed in the same manner. In addition, since the diopter scales for the right and left eyes are not always identical, delicate, individual diopter adjustments are possible for the right and the left.

When, at step 401, the glass lens 308 is found to be at the view field position, or when, at step 407 or 411, the diopter adjustment is completed and the processes at step 413 and 414 are performed, program control moves to the view field calibration at step 415 and the following steps.

When a viewfinder is independent from a camera as in this embodiment, it is natural to assume that the view field (picture field) that a camera lens is focused on is different from the view field (picture field) that a photographer focuses on in the view field frame of the independent viewfinder, and that the photographer cannot, therefore, obtain a photograph that is composed as he desires. To avoid this possibility it is necessary for the view fields to be matched. The processing for performing a so-called parallax correction is the "view field calibration" for this embodiment.

Since the view field calibration will be explained later while employing an arrangement for a camera system, part of which differs from that of the camera system shown in FIGS. 1 through 6, only a brief outline description of that processing will be given here.

During the view field calibration, first, at step 415, light from four LEDs, which are integral parts of the camera body 321 (and are so positioned that images projected by the LEDs form the four corners of a square), is projected toward a wall, etc., and defines a square that is around 2 m wide. Subsequently, the photographer moves his head to match an image (frame image) on the mask 311, that is viewed by the eye through the glass lens 308, with the LED image that is projected on the wall. When the images match, the release button 303b of the remote controller 303 is manipulated. When, at step 416, the CPU 335 receives a signal from the release button 303b, program control advances to step 417, where the distance to the wall on which the LED image is projected is measured by a range finder in the camera body 321. Then, at steps 418 and 419, the sound generators 306c in the independent viewfinder unit 301 generate sounds by employing a timed series of supersonic waves, and the time that elapses before the sounds reach the corresponding reception sections 321b in the camera body 321 is measured.

At step 420, the measured time periods are stored in a memory of the CPU 335 as values that correspond to a parallax between the independent viewfinder unit 301 and the lens of the camera 302.

The photographing that is performed after the above described processes are completed will now be explained while referring to the flowchart in FIG. 9.

When a photographer turns his head toward a target in a view field to match the view field frame (determines the composition of a photograph) and depresses the release button 303b of the remote controller 303 half a stroke, the camera CPU 335 receives this signal. At steps 501 and 502, the sound generators 306c in the independent viewfinder unit 301 generate sounds by employing a timed series of supersonic waves, the elapsed times between the generation of the sounds and the times they are received at the respective reception sections 321b of the camera body 321 are acquired. Then, to match the ratios of the time differences with those of the respective reception times, which were acquired during the previous view field calibration, the stepping motors 336a and 337a, which are constituents of the electric universal head in the camera body 321, are driven to adjust the direction of the view field for the camera body 321 so that it corresponds to the direction of the view field for the independent viewfinder unit 301.

More specifically, the adjustment is performed so that both view field directions match. For example, when the photographer who is wearing the independent viewfinder unit 301 turns his head to the right, the camera body 321 (its lens) accordingly turns right, while when the photographer lifts his head up, the camera body 321 turns up. In other words, the direction in which the camera body 321 is aimed is the same as the direction in which the independent viewfinder unit 301 is aimed, and the conditions are such that it is as though the independent viewfinder unit 301 and the camera body 302 are connected to each other by a 3-dimensionally linked mechanism. Since this processing will be also described in detail later, an explanation for it will not be given here.

Subsequently, at step 503, the distance to a target is measured by the range finder in the camera body 321. At step 504, a check is performed to determine whether or not the measured distance is a normal distance, i.e., within a range of from 1 m to ∞. If the distance is within the normal range, program control moves to step 508 where the sound generators 306c generate sounds, in a low audible range, that are employed as a focusing message (or, the flashing of the fluorescent tube 12 may be employed as a focusing message). At step 509, the release button 303b of the remote controller 303 is fully depressed and an ON signal from the release switch is received. Program control then advances to step 510, where the drive circuit 334 is driven to perform the well-known releasing, the film winding, etc. The photographing process is thereafter terminated.

If, at step 504, the measured distance does not fall within the range of from 1 m to ∞, for example, i.e., if a target is found to be nearer than 1 m, program control moves to step 505, where the stepping motors 336a and 337a of the camera body 321 are driven again up to values that differ from the predetermined parallax values, and correction for a short distance is performed. This correction is the same as the process that is performed with a normal lens shutter camera, where a short distance correction mark inscribed in the camera viewfinder is displayed and a mark for normal photography is turned off. Program control then goes to step 506, where the distance is again measured. A check is then performed at step 507 to determine whether or not the currently measured distance is nearly identical to the previously measured distance. If they are almost identical, the processing for step 508 and for the following steps is performed. If the currently measured distance differs greatly from the previously measured distance, it is assumed that the process is abnormal and program control branches to step 511 where an alarm is sounded or an error message is displayed by the display circuit 339 on an optical system.

After the above described photographing process is terminated, if the photographer does not expect to take another photograph soon, he will retract the glass lenses 308 that interfere with his field of vision. The retraction of the glass lenses 308 to remove them a photographer's field of vision will now be explained while referring to the flowchart in FIG. 10.

When the OFF button 303c of the remote controller 303 is depressed and the camera CPU 335 receives a signal to this effect, this processing is begun.

First, at step 601, the stepping motor 314 that drives the glass lens 308 is rotated counterclockwise (the stepping motor 314 for the right eye is rotated clockwise). At step 602, the number of steps is counted. Then, at step 603, the step count is compared with the previously stored step count (at step 414 in FIG. 8), with the processing at steps 601, 602, 603, and the loop to 601 being repeated until the two step counts. When, at step 603, they are found to match, it is assumed that the glass lens 308 has reached the storage position, as is shown in FIG. 2. Program control then advances to step 604 where the driving of the stepping motor 314 is halted.

As described above, to retract the glass lens 308 to the storage position, the glass lens 308 is shifted back, one step at a time, the number of steps that equals the step count stored during the process that advanced the glass lens 308 to the view field position. The glass lens 308 can therefore be returned to the storage position quickly.

Further, as was described previously, the previously stored step count is employed to advance the glass lens 308 to the view field position again, so that the glass lens 308 can be shifted quickly to the view field position and to the position at which the diopter adjustments were made by the photographer.

Figure 11:
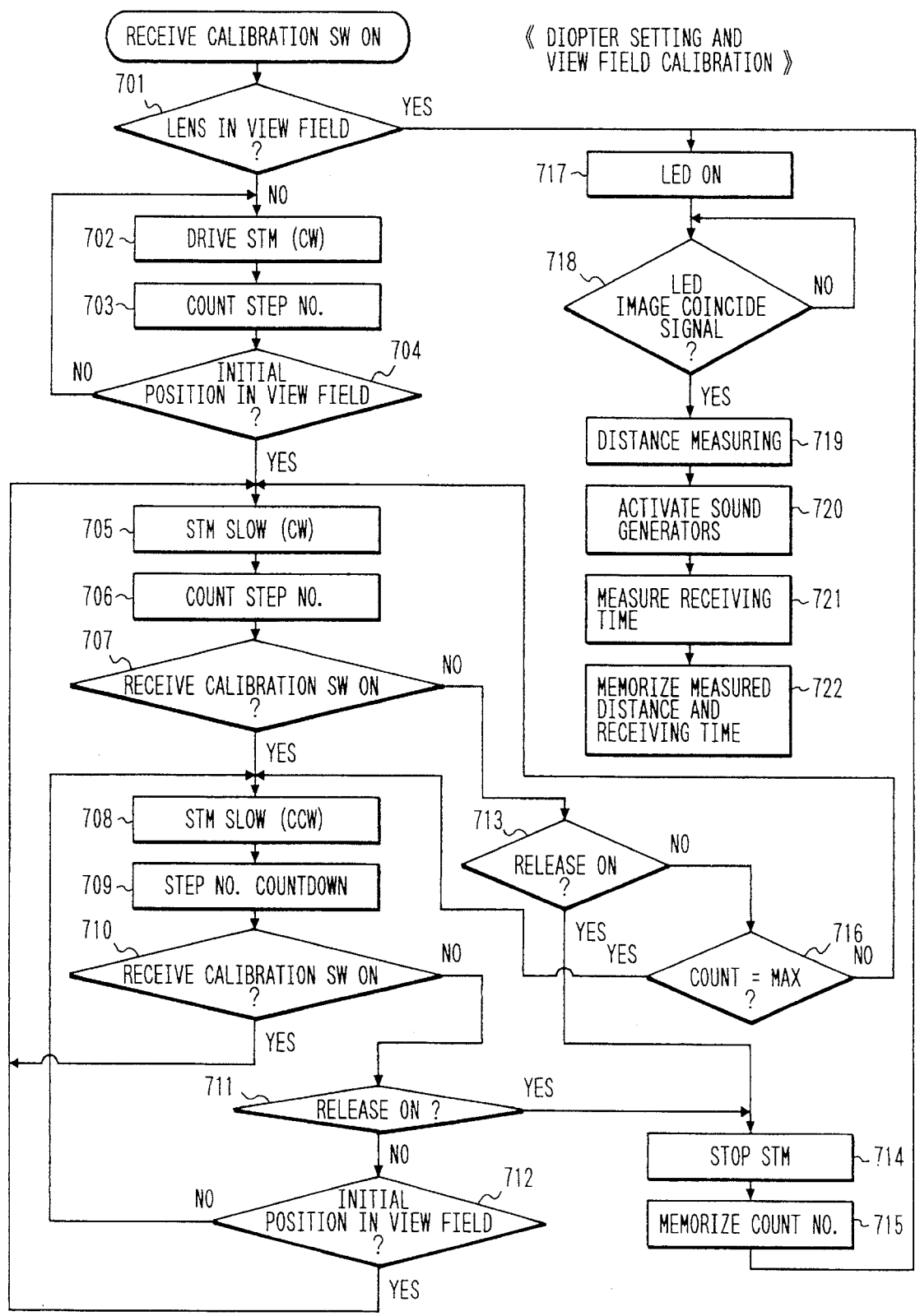
FIG. 11 is a flowchart showing the processing for a CPU of a camera for the setting of a diopter scale and for view field calibration according to a second embodiment of the present invention.

FIG. 11 is a flowchart for setting the diopter setting and for view field calibration according to a second embodiment of the present invention.

Since steps 701 through 706 and steps 714 through 722 are identical to steps 401 through 406 and steps 413 through 420 in FIG. 8, no explanation for them will be given here.

In accordance with the operation principle that when the diopter reading has slightly exceeded the peak, a person determines that the diopter is adjusted, i.e., the same principle as the so-called peak detection, the processing in this embodiment has been improved so that when the adjusted diopter has exceeded the peak, the first switch (the calibration switch 303a in this case) is depressed to invert the processing (step 707 to 708), and then the second switch (the release switch) is turned on to halt the processing (steps 713 and 711).

The processing will now be described while referring to the flowchart in FIG. 11.

At step 707, a check is performed to determine whether or not the calibration switch 303a is turned on because the diopter reading seems to have exceeded the peak while the stepping motor 314 was being slowly driven for the diopter setting. If, at step 707, the switch 303a is turned on, the stepping motor 314 is rotated inversely at step 708. Then, at step 709, the step count is decremented. When, at step 710, the calibration switch 303a is turned on because the peak has again been exceeded, it is assumed at step 711 that the diopter reading is at the peak and the release button 303b is manipulated. When an ON signal from the release switch is received, program control moves to step 714, where the driving of the stepping motor 314 is halted.

When, at step 711, an ON signal from the release switch is not received and, at step 712, the step count has not reached the step count for the initial view field position, the processing at steps 708, 709, 710, 711, 712, and the loop to step 708 is repeated. Then, when at step 712 it is found that the step count equals the step count for the initial view field position, program control returns to step 705, the processing is again inverted, and the same process is repeated.

When an ON signal from the release switch is first received while the stepping motor 314 is being slowly driven for the diopter adjustment (step 713), program control advances to step 714, as in the first embodiment. It is assumed that the diopter setting has been completed, and the driving of the stepping motor 314 is halted.

When neither the calibration switch 303a nor the release switch is turned on while the stepping motor 314 is being slowly driven for the diopter adjustment (steps 707 and 713), a check is performed at step 716 to determine whether or not the step count has reached MAX. When the step count has not yet reached MAX, the program loops to step 705 and the processing at step 705, 706, 707, 713, and 716 is repeated. If, at step 716, the step count has reached MAX, program control moves to step 708, where the reverse driving of the stepping motor 314 is begun.

If it is not possible for program control to advance to step 714, it is desirable for a photographer to be informed that the diopter cannot be further adjusted.

Although again only the driving of the glass lens 308 for the left eye has been explained also in this embodiment, the glass lens 308 for the right eye, of course, is symmetrically driven.

Further, the processing for the second embodiment is effective not only for a camera that has an independent viewfinder, but also for a normal focal plane shutter camera, a single-lens reflex camera, or a video camera.

The processing (3-dimension driving) for permitting the camera 302 to aim in the identical direction as the independent viewfinder unit 301 during the view field calibration, or while a photograph is being taken, will be explained in detail while referring to FIGS. 12 through 25.

It should be noted that, to define the processing better, unlike the first and second embodiments, the camera CPU 335 in the camera body 321 is separated into a universal head microcomputer (CPU) 71 and a camera microcomputer (CPU) 51, and several detection switches are added. Further, the camera system is so designed that the independent viewfinder is for single-eye use, instead of having the spectacles form, and the camera body is placed on a shoulder instead of being slipped into a pocket.

Figure 12:
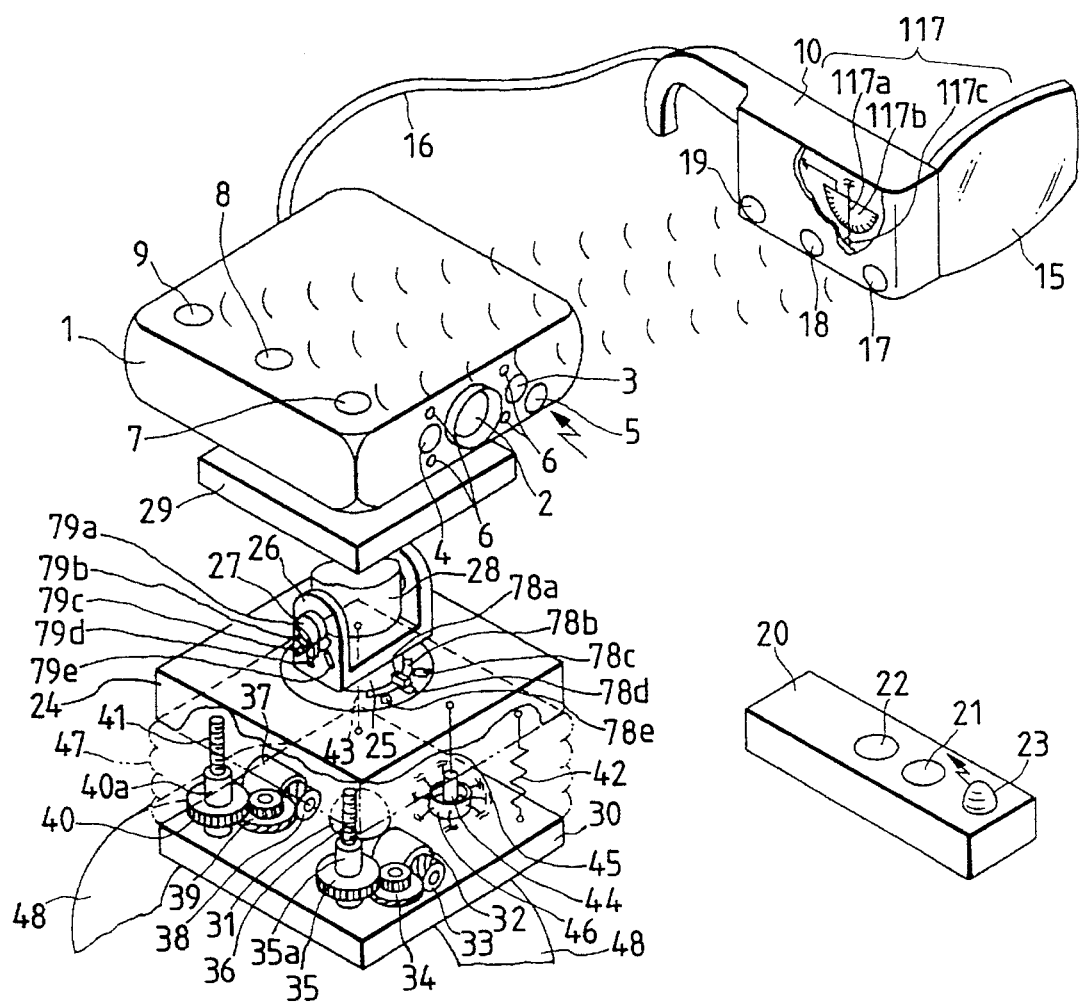
FIG. 12 is a perspective view of a camera system for explaining in detail the field calibration in the second embodiment.
Figure 13:
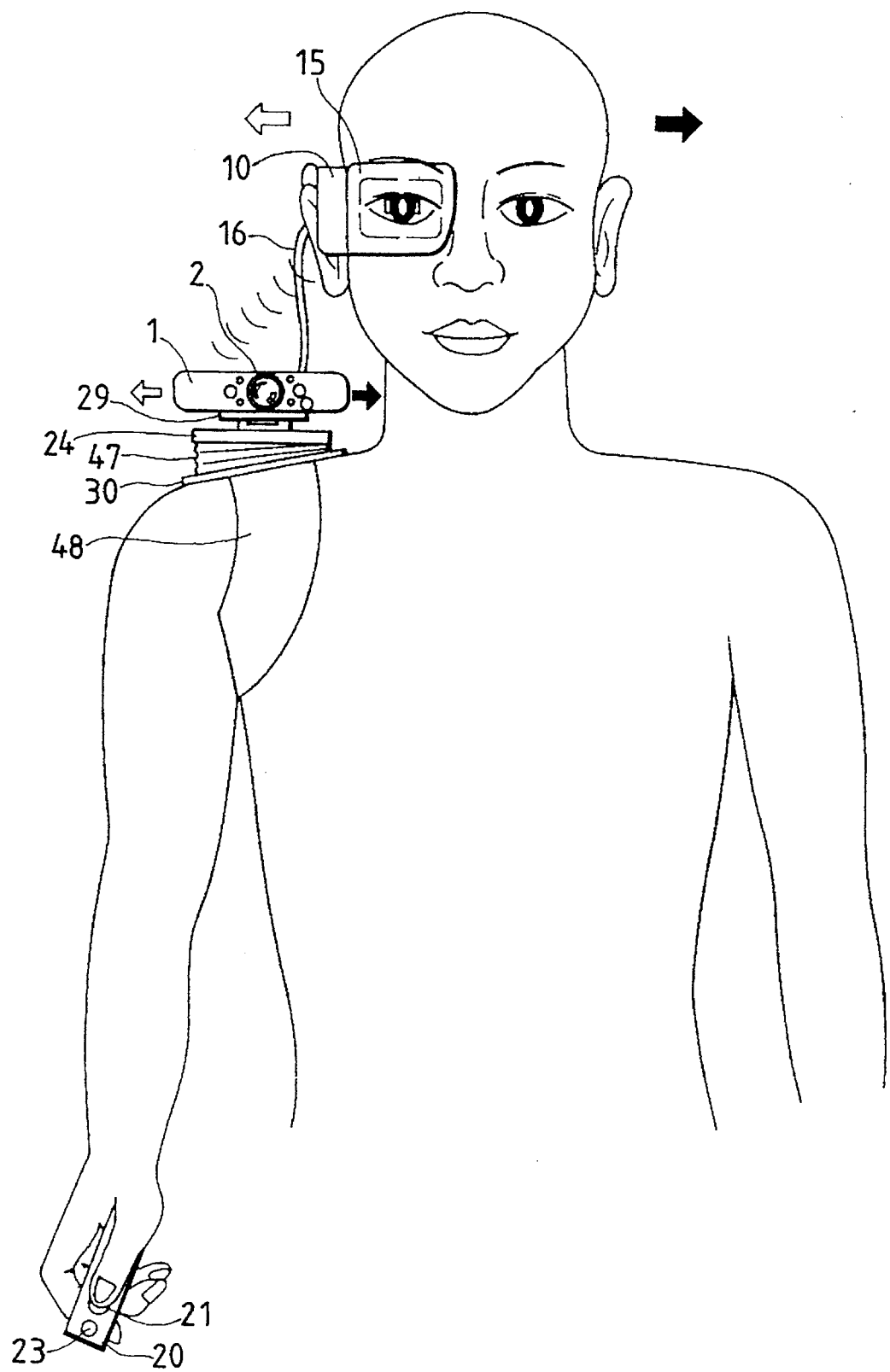
FIG. 13 is a diagram showing how a photographer employs the camera system in FIG. 12.
Figure 14:
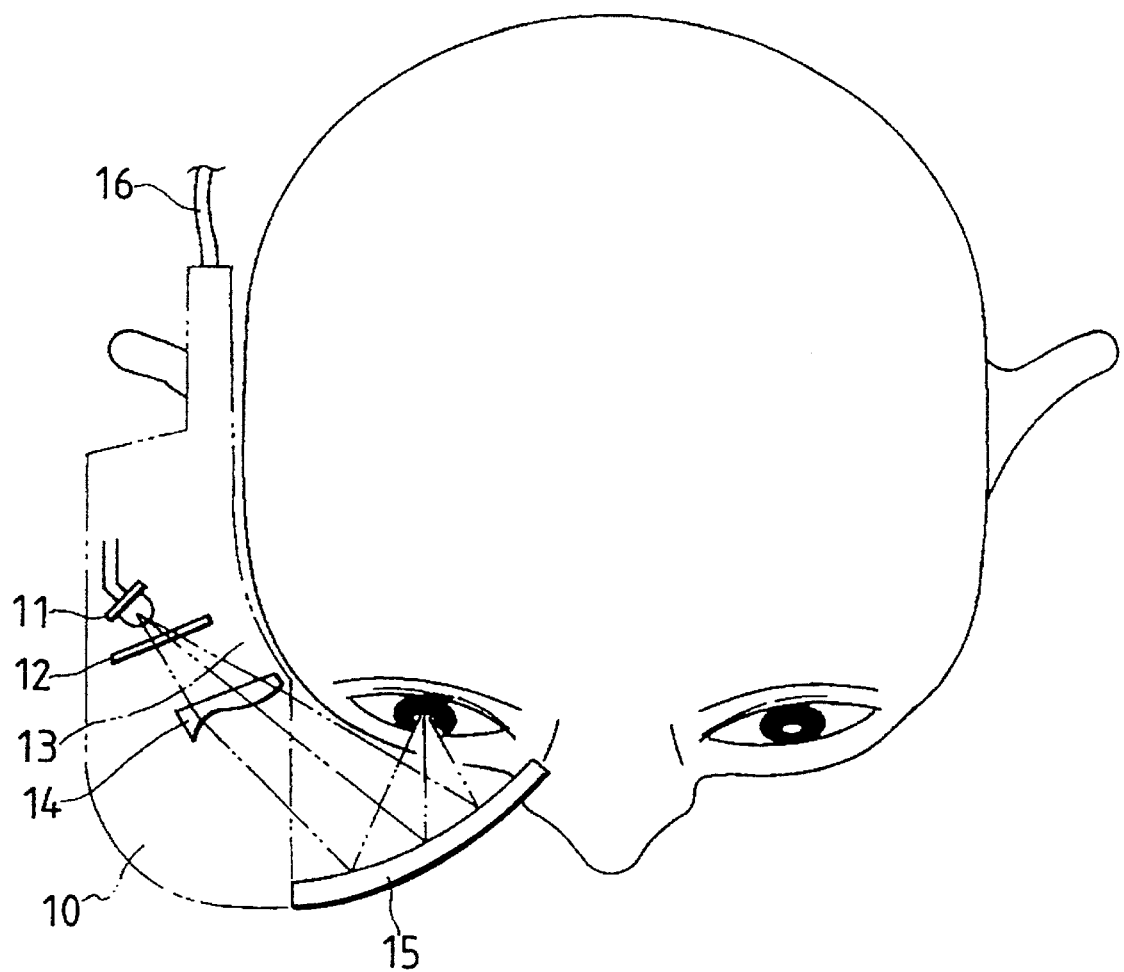
FIG. 14 is a diagram showing the structure of an independent viewfinder in FIG. 12 as viewed from above the head of a photographer.

FIG. 12 is a perspective view for a camera system that has an independent viewfinder; and FIG. 13 is a diagram illustrating the camera system in FIG. 12 that is being worn by a person. FIG. 14 is a top view of a person who has donned the independent viewfinder in FIG. 12 for the right eye, to illustrate the internal structure of the independent viewfinder.

In FIGS. 12 through 14, reference number 1 denotes a camera body; 2, a camera lens; 3, a light projector for an automatic focusing device of a camera; 4, a light receptor for the automatic focusing device; and 5, a remote control receptor for the camera. Four view field index illuminators 6, which are provided at identical intervals around the lens 2, project the positions of four corners, which correspond to the view field of a camera, on a surface that is perpendicular to the lens light axis in a manner that will be described later. Reference numbers 7, 8, and 9 denote receptors that correspond to sound transmission generators 17, 18, and 19 that are provided in an independent viewfinder 10, which will be described later.

The independent viewfinder 10 is formed and shaped like the right half of a pair of spectacles so that it can be positioned at the right eye, as is shown in FIGS. 13 and 14. A finder light 11, such as an LED, illuminates an image in a field frame 13. A diffusion plate 12 is employed to uniformly diffuse light from the finder light 11. A field lens 14 is an aspherical eccentric optical lens. A meniscus half mirror lens 15 is provided in front of the eye. A reflective material that serves as a half mirror is deposited by evaporation on the internal surface close to the eye, and the half mirror surface is formed as an aspherical eccentric optical type to restrain any eccentric aberration that may occur on the half mirror.

The meniscus half mirror lens 15 has the identical external and internal curvature radii. Since the meniscus lens 15 has no refractive power, even though it is transparent, incident light from the side of a target is reduced by 50%. The performance of the meniscus lens 15, however, is not deteriorated. A reflective optical system that guides the image in the field frame 13 to the eye requires the composed focal distance between the field lens 14 and the half mirror surface (internal surface) of the half mirror lens 15. Further, a parallel eccentricity of the meniscus half mirror lens 15, and the parallel eccentricity, the inclining eccentricity and the aspherical surface of the field lens 14 are combined, and the correction of the eccentric distortion is added to the field frame 13 to provide a correct field frame virtual image.

A signal & power supply line 16 is employed to exchange signals between the camera body 1 and the independent viewfinder 10, and to supply power from a power source (not shown) for the camera body 1 to the independent viewfinder 10. Sound generators 17, 18, and 19 for sound transmission are arranged in line along a temple whose distal end is put around the right ear to hold and position the independent viewfinder 10. The sound generators 17, 18, and 19 transmit sonic waves to the respective receptors 7, 8, and 9 that are arranged in line on the top surface of the camera body 1, enabling the camera body 1 and the independent viewfinder 10 to function as though they were components of a 3-dimensionally linked mechanism (the shifting and aiming of the camera are synchronized with the directional movements of a photographer's face).

An inclination detector 117, which is provided in the independent viewfinder 10, has the shape of a potentiometer. A movable contact element 117a, which is formed like a pendulum with a weight 117c at its distal end, slides across and contacts a semicircular resistance board 117b to measure the inclination of the independent viewfinder 10 (that is, when the photographer's face is inclined up or down) by changes in voltage.

By turning the following switches, a remote controller 20 transmits, to the camera body 1, a set signal, which is employed for the processing of matching the field of the camera body 1 and the view field of the independent viewfinder 10 and for storing the state in the camera (hereafter referred to as "view field calibration"), an SW1 signal, which is employed to permit the camera 1 to measure distance and light, and an SW2 signal, which is employed to perform exposing. Operation of a release switch 21, provided in the remote controller 20, consists of a first stroke and a second stroke. With the first stroke of the release switch 21 the SW1 signal is transmitted, while with the second stroke the SW2 signal is transmitted. A view field calibration switch 22 is also provided in the remote controller 20, and when the switch 22 is turned on a set signal for the view field calibration is produced. An iRED 23, which is also provided on the remote controller 20, is employed to transmit the above described signals as remote control signals to the camera body 1.

On an electric universal head upper unit 24 are provided components (a motor, a series of gears, etc.) for tilting or swinging the camera body 1. A rotary shaft 25 is employed to swing the camera body 1, while a support member 26 is employed to tilt the camera body 1. A shaft 27 is employed to tilt the camera body 1, and a shaft 28 is employed to support a camera mounting table 29. The camera mounting table 29 holds the camera body 1 by threading into an internal thread tripod connector (not shown), which is provided in the camera body 1, an external thread tripod connector (not shown).

The rotary shaft 25 for swinging the camera body 1 is fixed to the tilting support member 26, which in turn rotatably engages the shaft 27 for tilting. The camera mounting table support shaft 28 secures the shaft 27 for tilting the camera mounting table 29. The driving force is transferred from a motor 76 for swinging, which will be described later, to the rotary shaft 25 by a series of gears (not shown), and the rotary shaft 25 is rotatably arranged relative to the upper unit 24 of the electric universal head. The driving force is transferred from a motor 77 for tilting, via a series of gears (not shown), to the rotary shaft 27 for tilting, and the rotary shaft 27 is rotatably arranged relative to the support member 26.

An encoder 78 for swinging is synchronized with the rotation of the rotary shaft 25. At the neutral position where the camera body 1 faces the front, a movable contact element 78a renders a ground pattern 78b and a terminal pattern 78d, which are located around the base of the rotary shaft 25, conductive. When the camera body 1 is aimed to the left, the movable contact element 78a renders the ground pattern 78b and a terminal pattern 78c conductive. When the camera body 1 is aimed to the right, the movable contact element 78a renders the ground pattern 78b and a terminal pattern 78e conductive. An encoder 79 for tilting is synchronized with the rotation of the rotary shaft 27. At the neutral position where the camera body 1 faces the front, a movable contact element 79a renders a ground pattern 79b and a terminal pattern 79d, which are located on the side of the support member 26, conductive. When the camera body 1 faces upward, the movable contact element 79a renders the ground pattern 79b and a terminal pattern 79c conductive. When the camera body 1 faces down, the movable contact element 79a renders the ground pattern 79b and a terminal pattern 79e conductive.

Reference number 30 denotes a bottom board of the electric universal head. A hemispheric joint 31, which is secured to the bottom board 30, is fitted in a hemispheric joint recess (not shown) that is provided in the upper unit 24 to support the upper unit and permit it to move freely on the spherical surface.

A motor 32, which is fixed to the bottom board 30, serves as a power source to vary the posture of the upper unit 24 of the electric universal head. A worm gear 33 is fitted over the rotary shaft of the motor 32. A two-step gear 34 consists of a helical gear and a spur gear, and is rotatably fitted over a shaft (not shown) that is located perpendicular to the bottom board 30. A jack gear 35, which engages the spur gear of the two-step gear 34, is restricted in its movement in a thrust direction, and is rotatably fitted over a shaft (not shown) that is provided perpendicular to the bottom board 30. An internal thread that engages a feed screw 36, which will be described later, is formed on the internal wall of an upper cylindrical portion 35*a* of the jack gear 35 along in the same axis as that of the rotary shaft for the jack gear 35. The feed screw 36 is restricted in its rotational movement in the axial direction, is suspended like a pendulum and is fixed at its top end to the upper unit 24, and has an external thread that engages the internal thread formed on the internal wall of the upper cylindrical portion 35*a* of the jack gear 35. To horizontally feed the upper unit 24 of the universal head, the jack gear 35 is driven by the motor 32 to feed or retract the feed screw 36.

A motor 37, which is fixed to the bottom board 30, serves as a power source, as does the motor 32, to vary the posture of the upper unit 24 of the electric universal head. A worm gear 38 is fitted over the rotary shaft of the motor 37. A two-step gear 39 consists of a helical gear and a spur gear, and is rotatably fitted over a shaft (not shown) that is located perpendicular to the bottom board 30. A jack gear 40, which engages the spur gear of the two-step gear 39, is restricted in its movement in a thrust direction, and is rotatably fitted over a shaft (not shown) that is provided perpendicular to the bottom board 30. An internal thread that engages a feed screw 41, which will be described later, is formed on the internal wall of an upper cylindrical portion 40*a* of the jack gear 40 along the same axis as that of the rotary shaft of the gear 40. The feed screw 41 is restricted in its rotational movement in the axial direction, is suspended like a pendulum and is fixed at its top end to the upper unit 24, and has an external thread that engages the internal thread formed on the internal wall of the upper cylindrical portion 40*a* of the jack gear 40. To horizontally feed the upper unit 24 of the universal head, the jack gear 40 is driven by the motor 37 to feed or retract the feed screw 41.

Tension springs 42 and 43 are positioned opposite the two jack gears 35 and 40, with the hemispheric joint 31 between them, to pull together the upper unit 24 and the bottom board 30 of the electric universal head.

Components 44 through 46 constitute a posture detection switch on the upper unit 24 of the universal head. More specifically, while a weight element 44 and a support line 45 are rendered conductive, the weight element 44 is suspended from the upper unit 24 by the support line 45, which is formed of a material that can effectively dampen vibration so that the weight element 44 will not be easily affected by vibration. A posture element 46 that is provided encloses the weight element 44 and has an almost circular shape. The weight element 44 can be positioned in the center of the posture element 46 so that the posture of the upper unit 24 can be detected at eight positions.

A cover member 47 (indicated by the double-dashed chain line in FIG. 12) extends from the upper unit 24 to the bottom board 30 and is shaped like bellows so that it can be expanded and compressed. A shoulder belt 48 is attached to the bottom board 30 of the electric universal head and can be strapped around on the shoulder of a photographer, as is shown in FIG. 13.

Figure 15:
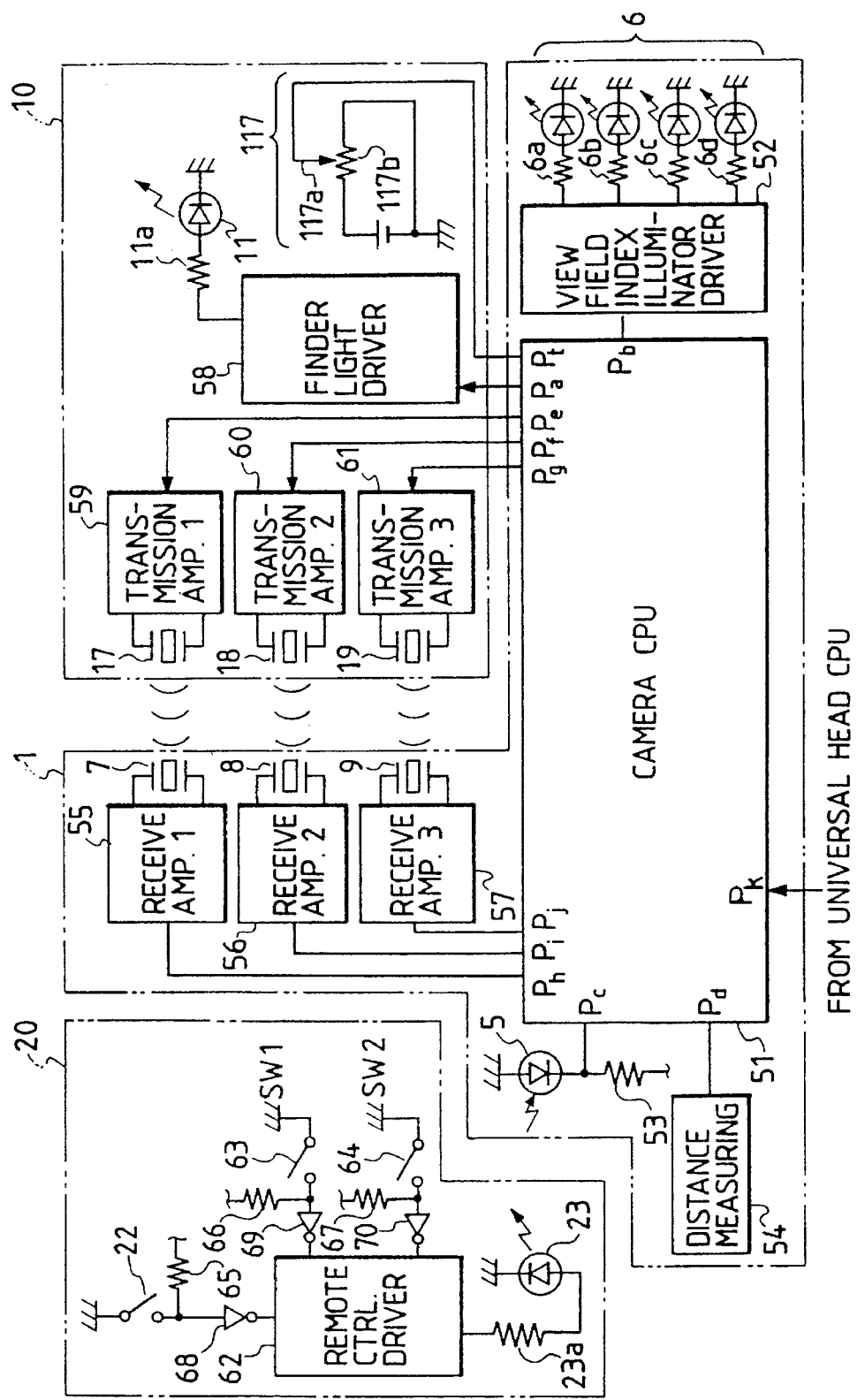
FIG. 15 is a block diagram illustrating the individual electric arrangements of a part of the camera, the independent viewfinder, and a remote controller, which are included in the camera system in FIG. 12.
Figure 16:
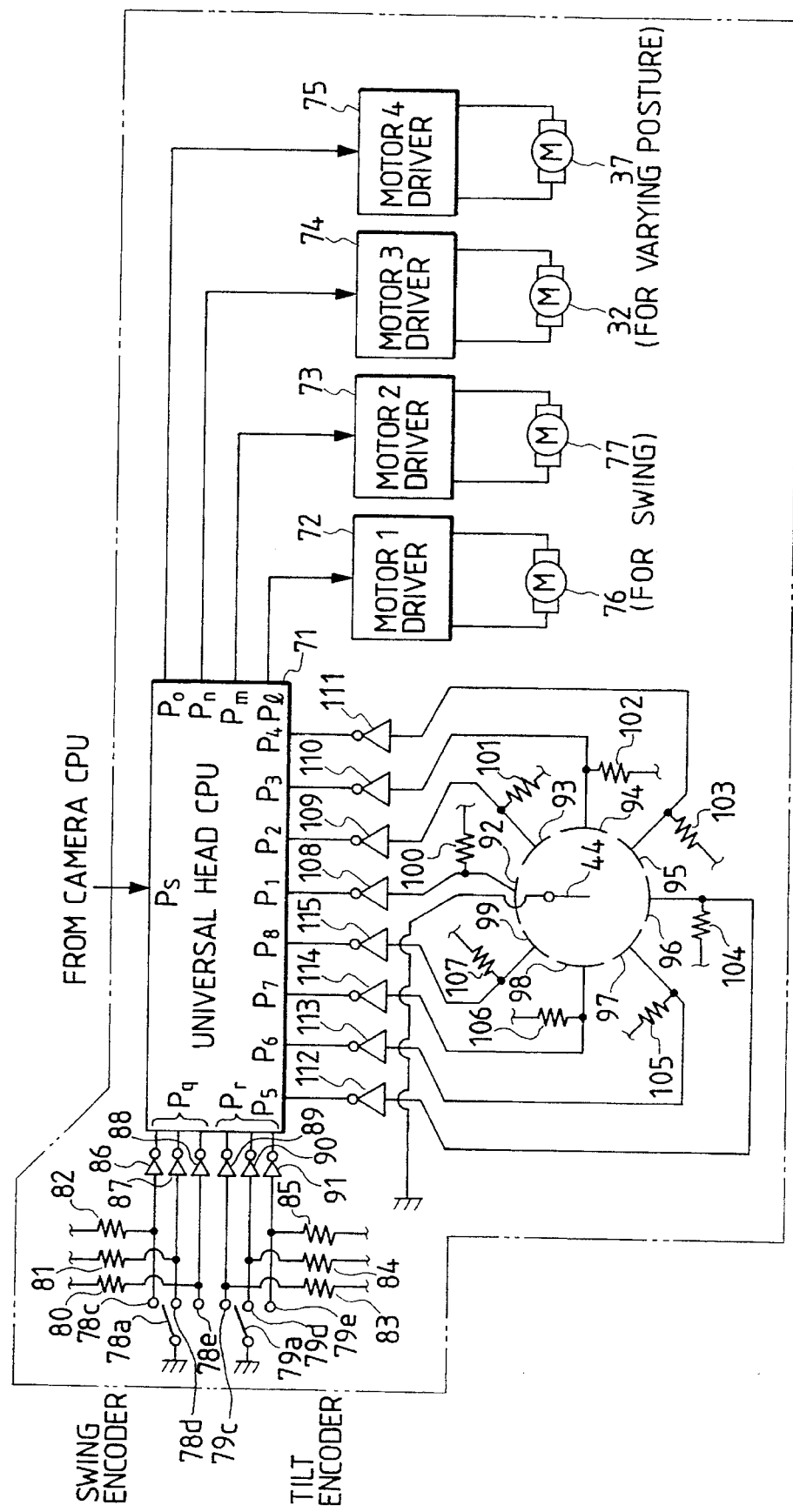
FIG. 16 is a block diagram illustrating the electric arrangement of the electric universal head in the camera system in FIG. 12.

FIGS. 15 and 16 are block diagrams illustrating the electrical arrangement for the thus structured camera system. FIG. 15 is an illustration of the camera body 1, the independent viewfinder 10, and the remote controller 20; and FIG. 16 is an illustration of the electric universal head.

First, the arrangement of the camera body 1 will now be explained.

In FIG. 15, the microcomputer 51 (hereafter referred to as a "camera CPU"), which is installed in the camera body 1, controls the individual circuits in the independent viewfinder 10, exchanges signals with the microcomputer 71 of the electric universal head (hereafter referred to as a "universal head CPU"), which will be described later, and receives a remote control signal from the remote controller 20 to perform the photographing preparation process and the photographing. A view field index illuminator driver 52, which drives the four camera view field index illuminators 6, receives a drive signal from port $P_b$ of the camera CPU 51. Reference numbers 6*a* through 6*d*, and 53 denote resistors, and $P_c$ denotes a port of the camera CPU 51 at which a remote control signal is input from the remote controller 20 via the remote control receptor 5. A known distance measuring means 54 includes the previously described light projector/receptor 34, for active auto focusing, and a focus detection circuit, and exchanges signals with the camera CPU 51 via port $P_d$. Reception amplifiers 55, 56, and 57, which correspond to the receptors 7, 8, and 9, amplify the signals received by the receptors 7, 8, and 9 and transmit the amplified signals to ports $P_h$, $P_i$, and $P_j$ of the camera CPU 51, respectively.

The circuit arrangement for the independent viewfinder 10 will now be described.

A finder light driver 58, which drives the finder light 11, such as an LED, via a resistance 11*a*, receives a drive signal from port $P_a$ of the camera CPU 51. Transmission amplifiers 59, 60, and 61, which correspond to the respective sound generators 17, 18, and 19, employ drive signals transmitted through ports $P_e$, $P_f$, $P_g$ of the camera CPU 51 to drive the sound generators 17 through 19. The inclination detector 117, which was described previously, transmits a voltage value that corresponds to the forward and backward inclination of the independent viewfinder 10 to port $P_t$ of the camera CPU 51.

The circuit arrangement for the remote controller 20 will now be described.

A remote control driver 62 generates an iRED drive signal having a pattern that corresponds to each switch, and irradiates the signal transmission iRED 23 through the resistor 23*a*. Reference number 22 denotes a view field calibration switch; 63, a first stroke switch (SW1); 64, a second stroke switch (SW2); 65 through 67, pull-up resistors; and 68 through 70, inverters that output high level signals when the first stroke switch 63 and the second stroke switch 64 are turned on.

The circuit arrangement of the electric universal head will now be described while referring to FIG. 16.

In FIG. 16, the universal head CPU 71 controls the individual circuits of the electric universal head. Instead of the stepping motors 336*a* and 337*a* in the previous example, motor drivers 72 through 75 in this example drive respectively the motor 76 for swinging, the motor 77 for tilting, and the motors 32 and 37 for varying the posture of the camera body 1. Drive signals are transmitted to these drivers 72 through 75 from ports $P_l$ through $P_o$ of the universal head CPU 71. A swing encoder 78 and a tilt encoder 79 have the previously described arrangement. Reference numbers 80 through 85 denote pull-up resistors. Inverters 86 through 91 output high level signals by setting the terminal patterns of the encoders 78 and 79 to the conductive state. The signals from the inverters 86 through 91 are input to port $P_q$ (for a swing encoder signal) and port $P_r$ (for a tilt encoder signal) of the universal head CPU 71.

Divided elements 92 through 99 constitute the posture element 46 for enabling detection of the posture at eight positions. When the elements 92 through 99 contact the weight element 44, posture signals are generated by the elements 92 through 99. Reference numbers 100 through 107 denote pull-up resistors. Inverters 108 through 115 output high level signals by rendering conductive (ON) the elements that constitute the posture element 46 with the weight element 44. The individual posture signals are transmitted to ports $P_1$ through $P_8$ of the universal head CPU 71.

The universal head CPU 71 receives, via ports $P_k$ through $P_s$ of the camera CPU 51, the results that are obtained by arithmetic operations that are based on signals received by the receptors 7, 8, and 9, and drives the motors 76, 77, 32, and 37 so as to match the finder field with the camera field.

With the above described arrangement, the processing of the camera system will now be explained while referring to FIGS. 12 through 26, 32A to 32C, and by employing the flowcharts in FIGS. 17 through 22 and 27 through 31.

A program that corresponds to the procedures in the flowcharts in FIGS. 17, 19, 27, and 30 is stored in a ROM that is incorporated in the camera CPU 51, while a program that corresponds to the procedures in the flowcharts in FIGS. 19 through 22, 28, 29, and 31 is stored in a ROM that is incorporated in the universal head CPU 71.

Figure 17:
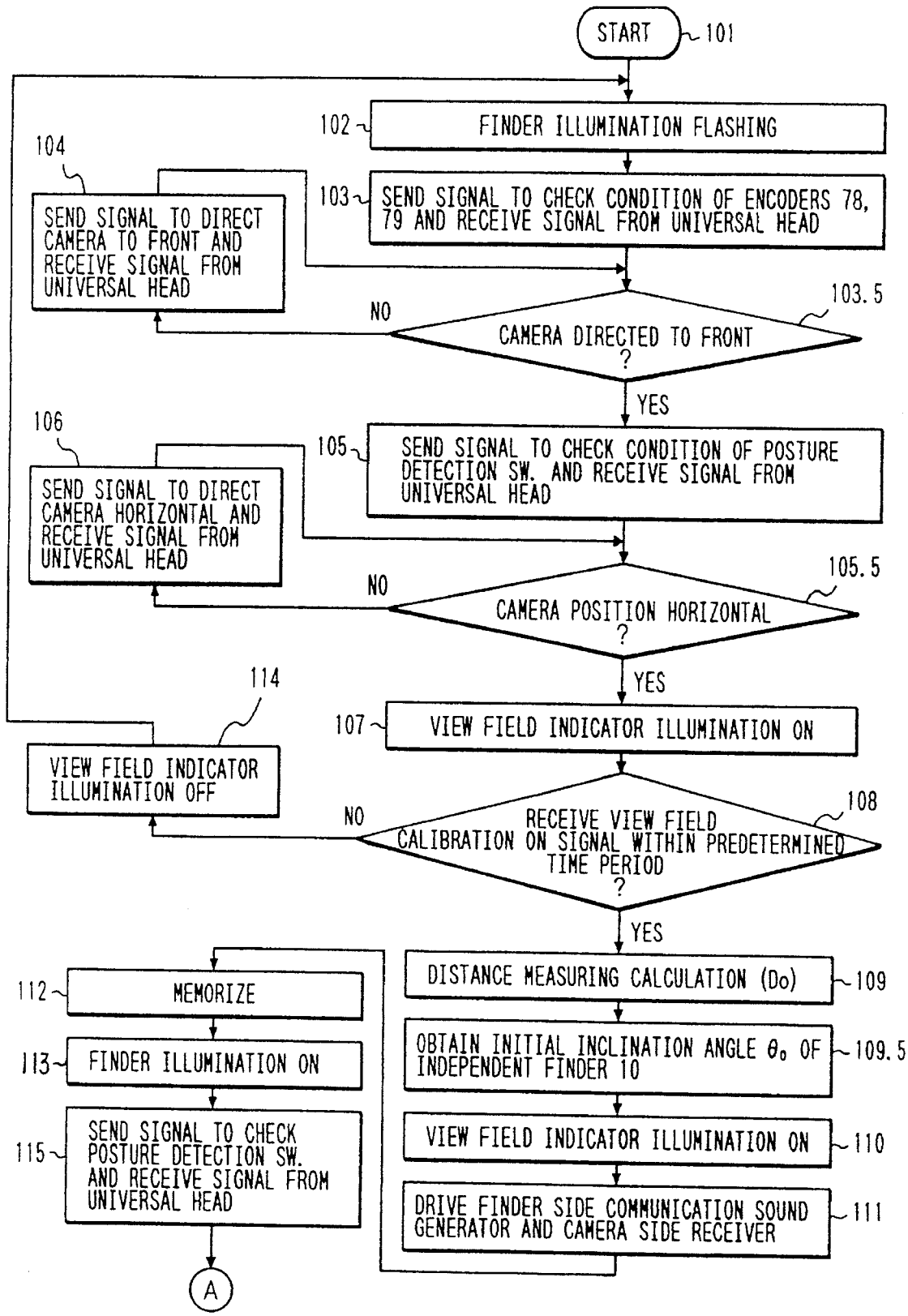
FIG. 17 is a flowchart showing part of the main processing performed by a camera microcomputer (CPU) in FIG. 15.
Figure 18:
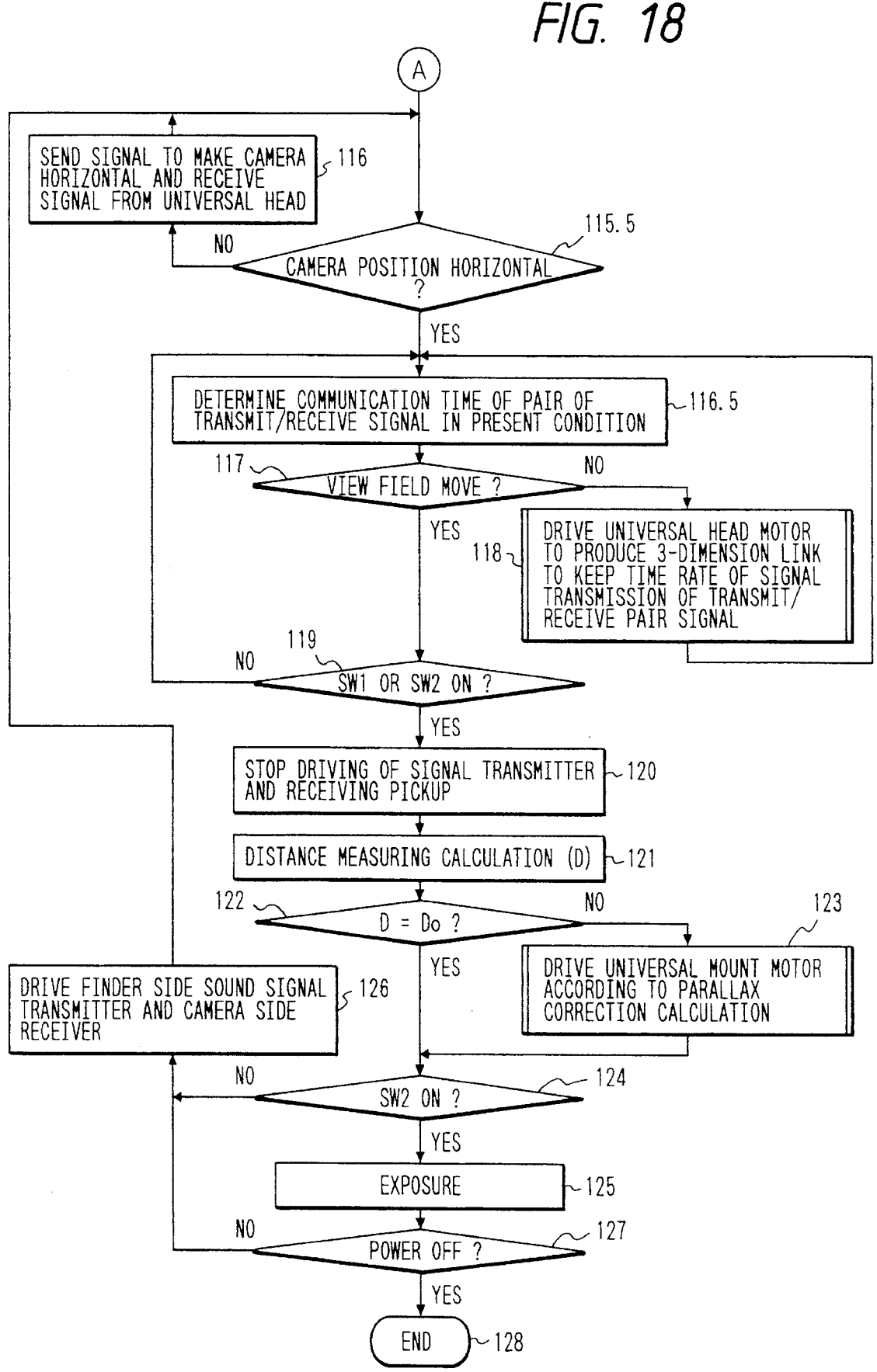
FIG. 18 is a flowchart showing the processing which follows that which was included in FIG. 17.

First, the main processing of the camera CPU 51 will now be described while referring to FIGS. 17 and 18.

When with a power switch (not shown) on, the camera CPU 51 and the universal head CPU 71 are powered on and the power up is cleared (step 101), the processing at step 102 and the following steps are performed.

A signal for flashing the finder light 11 is sent from port $P_a$ to the finder light driver 58 of the independent viewfinder 10, and the finder light 11 is flashed (step 102). A photographer can therefore see the blinking of the field frame 13 in the view finder field, and can infer from this that view field calibration has not yet been performed.

For the preparation for the view field calibration, to determine whether or not the camera body 1 mounted on the photographer's shoulder is pointed to the front, a command signal is transmitted from port $P_k$ to port $P_s$ of the universal head CPU 71 to check on the conditions of the swing encoder 78 and the tilt encoder 79 (step 103).

Figure 19:
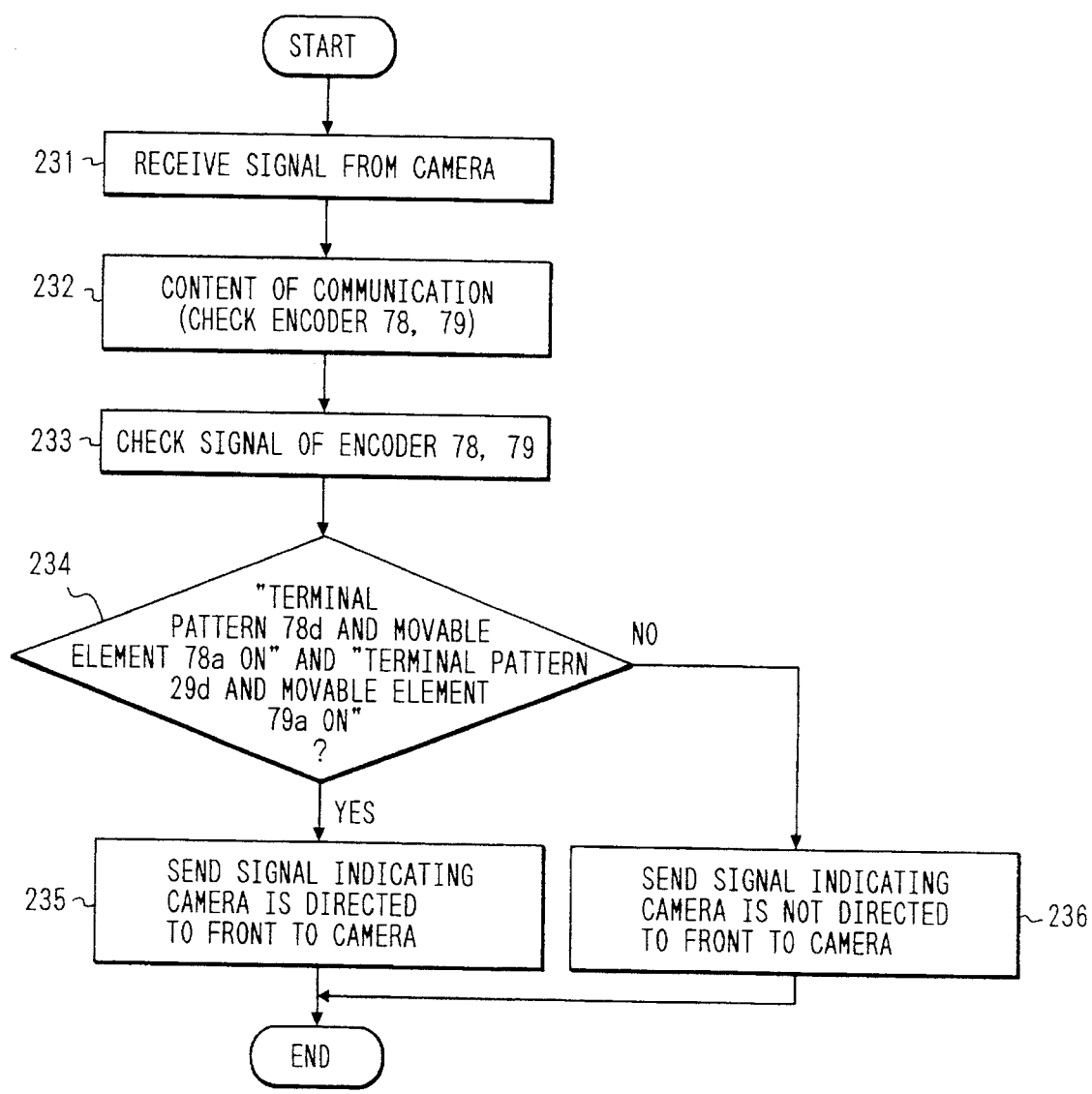
FIG. 19 is a flowchart showing the processing performed by a universal head microcomputer (CPU) based on a signal that is transmitted at step 103 in FIG. 17.

As is shown in FIG. 19, in response to the command signal, the universal head CPU 71 inputs signals from the encoders 78 and 79 via ports $P_g$ and $P_r$. When the terminal patterns 78d and 79d are rendered conductive (hereafter referred to as "ON") by the movable elements 78a and 79a, respectively, it is determined that the camera body 1 is located at the neutral position for both swinging and tilting and is directed to the front, and this result is transmitted to the camera CPU 51. If the terminal patterns 78d and 79d are not rendered conductive by the movable elements 78a and 79a, a signal indicating that the camera body 1 is not directed to the front is transmitted to the camera CPU 51.

When a signal indicating the direction in which the camera body 1 is pointed is received from the universal head CPU 71, a check is performed to determine whether or not the camera body 1 is directed to the front (step 103.5). If the camera body 1 is not directed to the front, program control moves to step 104. If the camera body 1 is directed to the front, program control advances to step 105.

At step 104, a command signal is sent via port $P_k$ to the universal head CPU 71 to point the camera body 1 to the front. Program control thereafter returns to step 103 and the same determination is repeated.

Figure 20:
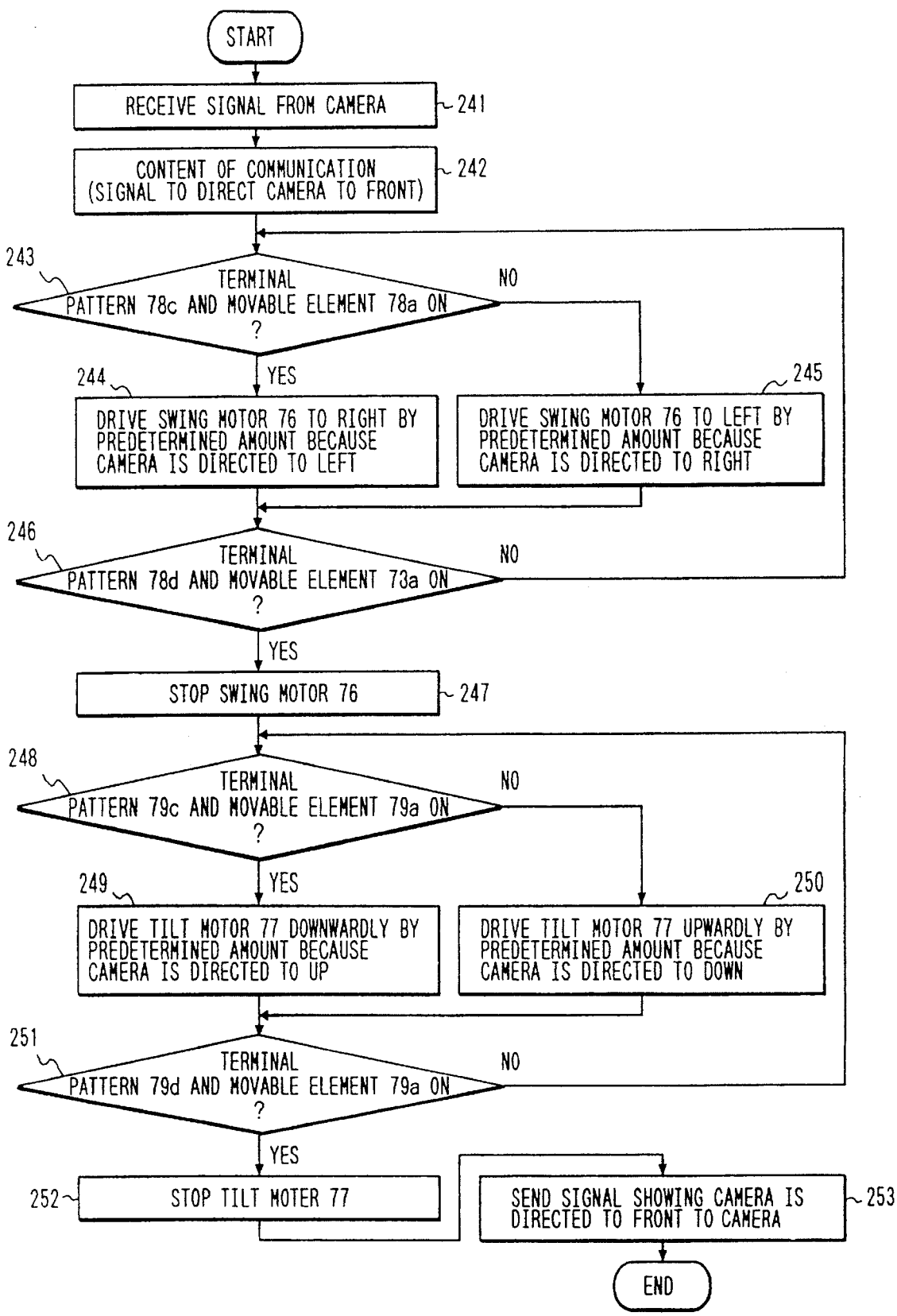
FIG. 20 is a flowchart showing the processing performed by the universal head CPU based on a signal that is transmitted at step 104 in FIG. 17.

As is shown in FIG. 20, when the terminal pattern 78c of the swing encoder 78 is ON, the universal head CPU 71 determines that the camera body 1 is directed to the left. When the terminal pattern 78e is ON, the universal head CPU 71 determines that the camera body 1 is directed to the right. When the terminal pattern 79c of the tilt encoder 79 is ON, the universal head CPU 71 determines that the camera body 1 is directed upward. When the terminal pattern 79e is ON, the universal head CPU 71 determines that the camera body 1 is directed downward. Then, to render both the terminal patterns 78d and 79d of the encoders 78 and 79 ON, the universal head CPU 71 transmits a drive signal for the swing motor 76 from port $P_l$ to the driver 72, and/or transmits a drive signal for the tilt motor 77 from port $P_m$ to the driver 73, so that both motors 76 and 77 are appropriately driven.

When, as a result of the above communication, it is found at step 103.5 that the camera body 1 has been directed to the front, program control moves to step 105.

In order to simplify the drawing, the details of the processing at steps 103 and 104 for the camera CPU 51 and for the universal head CPU 71 are not included in the flowchart.

For the preparation for the view field calibration, at step 105, as well as at step 103, to determine whether or not the camera mounted on the photographer's shoulder is not inclined and is positioned horizontally, a command signal is sent from port $P_k$ of the camera CPU 51 to port $P_s$ of the universal head CPU 71 to check the condition of the posture detection switch.

Figure 21:
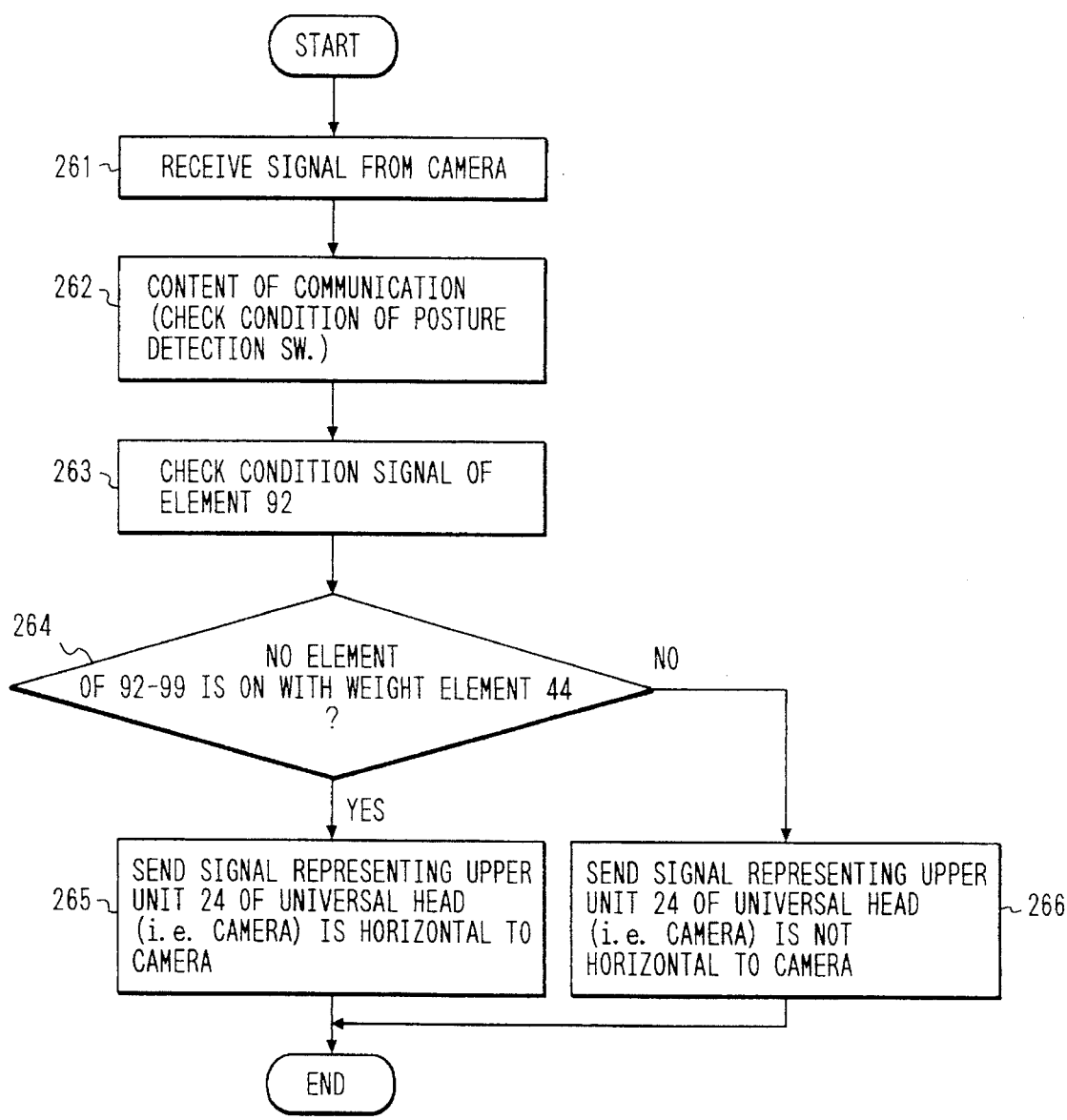
FIG. 21 is a flowchart showing the processing performed by the universal head CPU based on a signal that is transmitted at step 105 in FIG. 17.

As is shown in FIG. 21, upon the receipt of the command signal, the universal head CPU 71 receives the signals indicating the conditions of the elements 92 through 99 from ports $P_1$ through $P_8$. If signals indicating that the elements 92 through 99 are turned ON are not input at ports $P_1$ through $P_8$, the universal head CPU 71 determines that the camera body 1 is horizontally positioned and transmits this result to the camera CPU 51. If any of the elements 92 through 99 is turned ON, the universal head CPU 71 determines the inclination direction of the camera by referring to the element 92 to 99 that is ON, and transmits to the camera CPU 51 a signal indicating that the camera body 1 is not horizontal.

At step 105.5, when a posture signal for the camera body 1 is sent from the universal head CPU 71, a check is performed, by referring to the posture signal, to determine whether or not the camera body 1 is in the horizontal state. When the camera body 1 is not in the horizontal state, program control moves to step 106. When the camera body 1 is in the horizontal state, program control advances to step 107.

Then, at step 106, a command signal is sent from port $P_k$ to the universal head CPU 71 to position the camera body 1 horizontally. Program control thereafter returns to step 105.5, and the same process is repeated.

Figure 22:
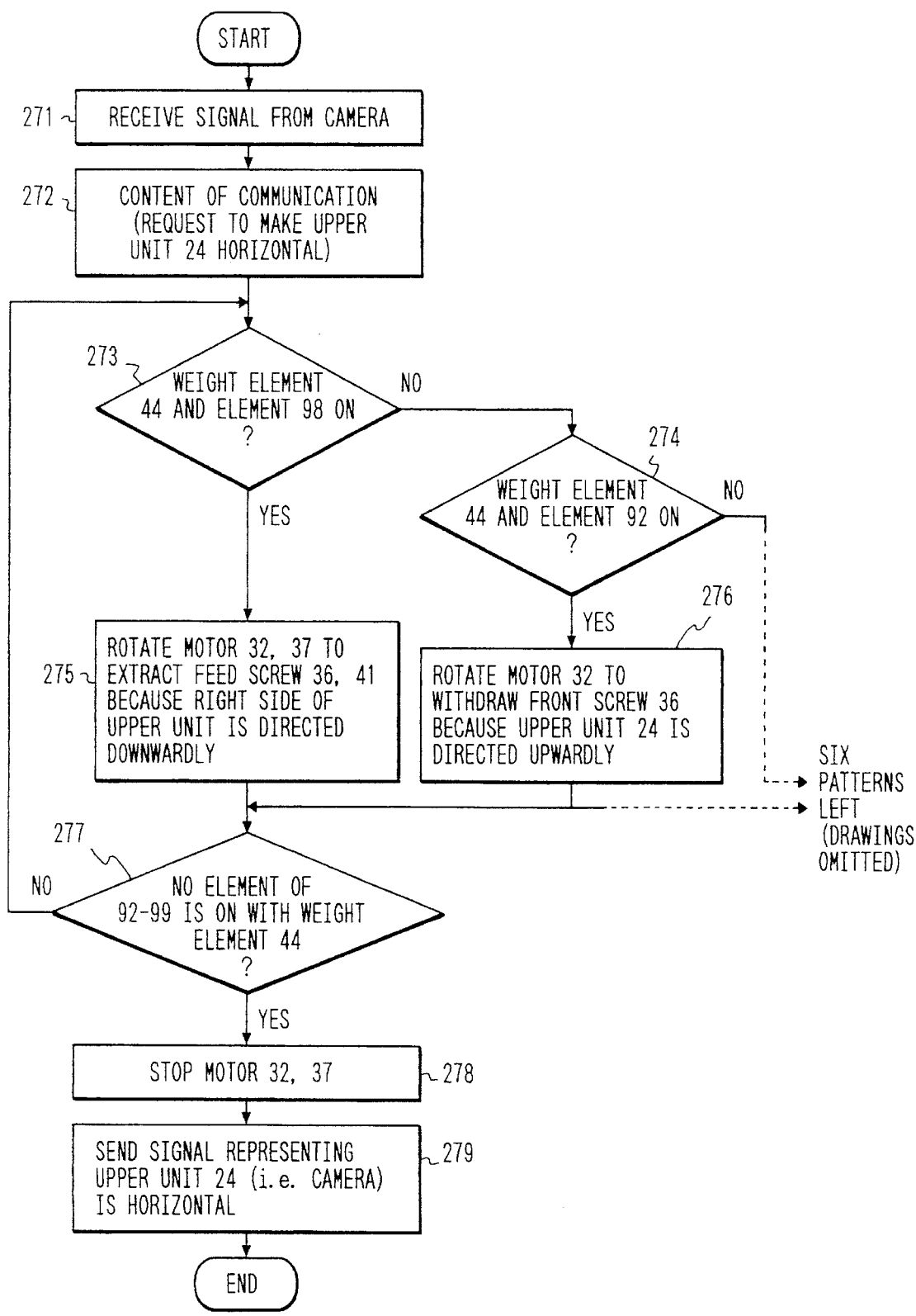
FIG. 22 is a flowchart showing the processing performed by the universal head CPU based on a signal that is transmitted at step 106 in FIG. 17.
Figure 23:
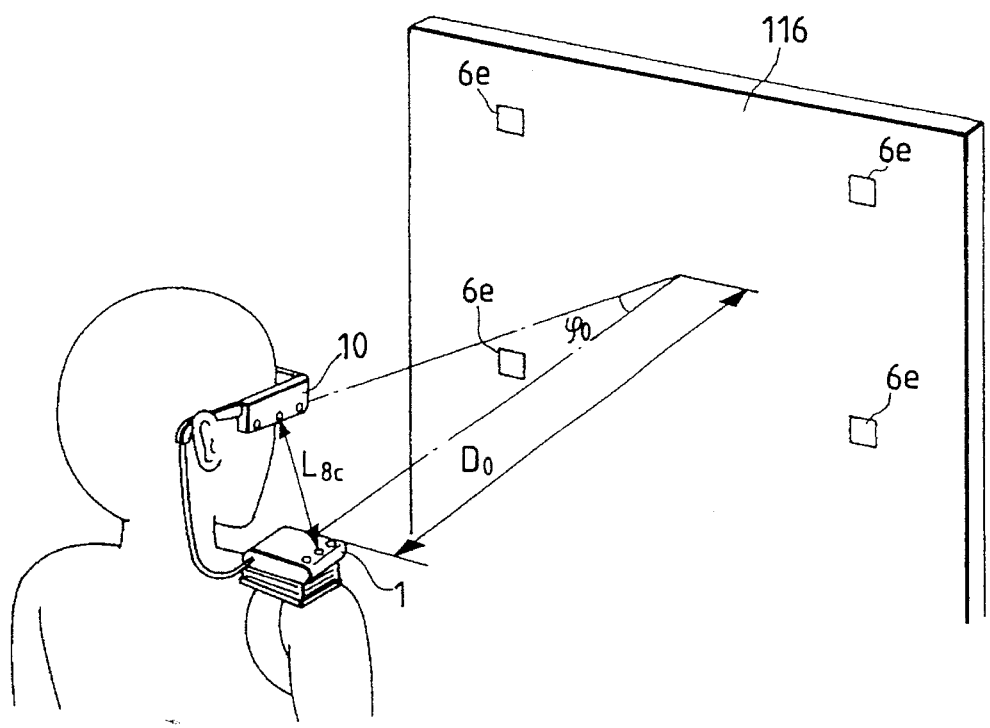
FIG. 23 is a diagram that illustrates the performance of field calibration according to the first and second embodiment of the present invention.

As is shown in FIG. 22, based on the determination at step 105, the universal head 71 that receives this command signal sends a drive signal for the motor 32 from port $P_n$ to the driver 74 and a drive signal for the motor 37 from port $P_o$ to the driver 75 so that none of the elements 92 through 99 are rendered ON, and properly drives the motors 32 and 37. When, for example, the camera body 1 on the right shoulder is tilted to the right along the inclined surface of the shoulder, the weight element 44 contacts the element 98 and an ON signal is sent to port $P_7$ of the universal head CPU 71. Thus, the motors 32 and 37 are activated and drive the series of gears to position the camera horizontally.

When, at step 105.5, it is found that as the result of the communication the camera body 1 has been positioned horizontally, program control moves to step 107.

To simplify the drawing, the details of the processing at steps 103 and 104 for the camera CPU 51 and for the universal head CPU 71 are not given.

Subsequently, at step 107, a signal is sent from port $P_b$ to the view field index illuminator driver 52 to light the four camera view field index illuminators 6.

Figure 24:
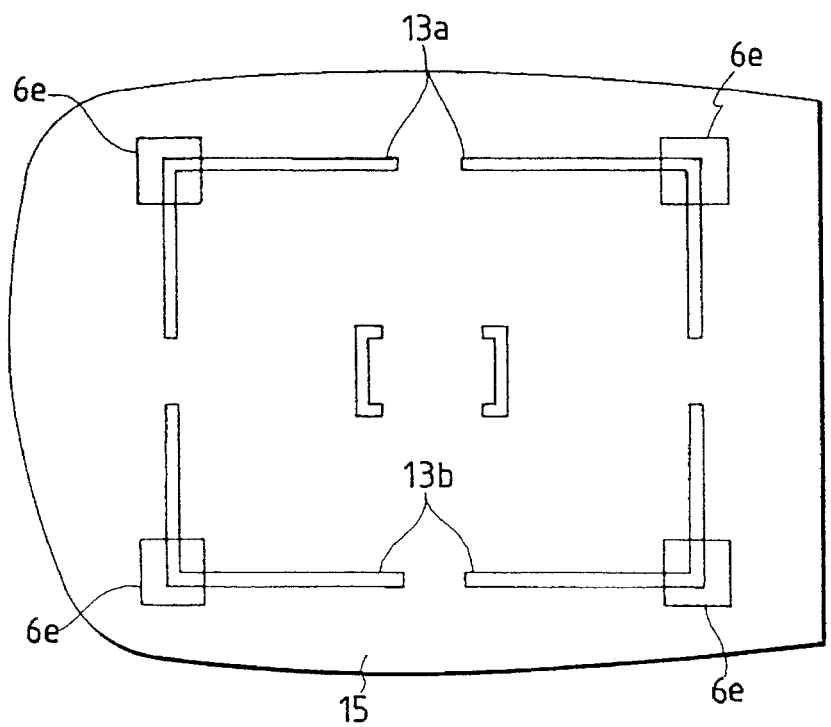
FIG. 24 is a diagram showing the state when an illuminated image for a camera field indicator is aligned with the four corners of a field frame image during field calibration according to the first and second embodiments.

In this case, a photographer faces a vertical white wall 116, etc., at a predetermined interval (e.g., around 2 m), and projects the camera view field index illuminators 6 on the white wall 116, as is shown in FIG. 24 (which shows the conditions for the view field calibration). While the photographer looks at the projected view field index illuminated images 6e through the meniscus half mirror lens 15 of the attached independent viewfinder 10, he superimposes the four corners of an image 13a in the field frame 13 on the illuminated images 6e, as is shown in FIG. 24. If the illuminated images 6e do not exactly match the four corners of the image 13a of the field frame 13, the distance to the white wall 116 is different from a predetermined distance. Thus, a photographer must change his position so as to match the four corners of the image 13a with the illuminated images 6e. When the illuminated images 6e and the four corners of the image 13a match, the photographer turns on the view field calibration switch 22 of the remote controller 20. Reference number 13b denotes an AF distance measuring frame.

Then, at step 108, a check is performed to determine whether or not the view field calibration switch 22 of the remote controller 20 is turned on, and a set signal is transmitted when the camera view field index illuminator flashing signal is sent at step 107, i.e., when a period of time, which is measured by a timer (not shown) of the camera CPU 51, has expired since the view field calibration was begun. When a set signal is not sent as a remote control signal within a predetermined period of time, program control goes to step 114. When the set signal is sent as a remote control signal, program control advances to step 109.

The processing by the remote controller 20 will now be briefly explained. When the view field calibration switch 22 is turned on by the photographer, the remote control driver 62 drives the transmission iRED 23 by employing a signal for a pattern that corresponds to the ON signal of the switch 22. Then, a projection signal (set signal) is emitted by the transmission iRED 23 and is sent to the remote control receptor 5 of the camera, and is then transmitted to port $P_c$ of the camera CPU 51.

In this case, with the supposition that a set signal for the view field calibration has been input within the predetermined period of time, program control moves to step 109.

At step 109, a distance measuring signal is output from port $P_d$ to the distance measuring means 54. In response to this signal, the distance measuring means 54 performs distance measuring by employing known active auto focusing, and outputs the result via port $P_d$ to the camera CPU 51. Upon receipt of the result, the camera CPU 51 calculates the distance $D_0$ (hereafter referred to as a "reference distance") between the camera body 1 and the white wall 116 during the view field calibration (see FIG. 24).

A voltage value obtained from the inclination detector 117 is sent to port $P_t$ and this voltage value is determined as an initial inclination angle $\theta_0$ of the independent viewfinder 10 (step 109.5).

To save on electricity, an OFF signal is sent from port $P_b$ to the view field index illuminator driver 52 to turn off the four camera view field index illuminators 6 as their light is no longer required (step 110).

Figure 25:
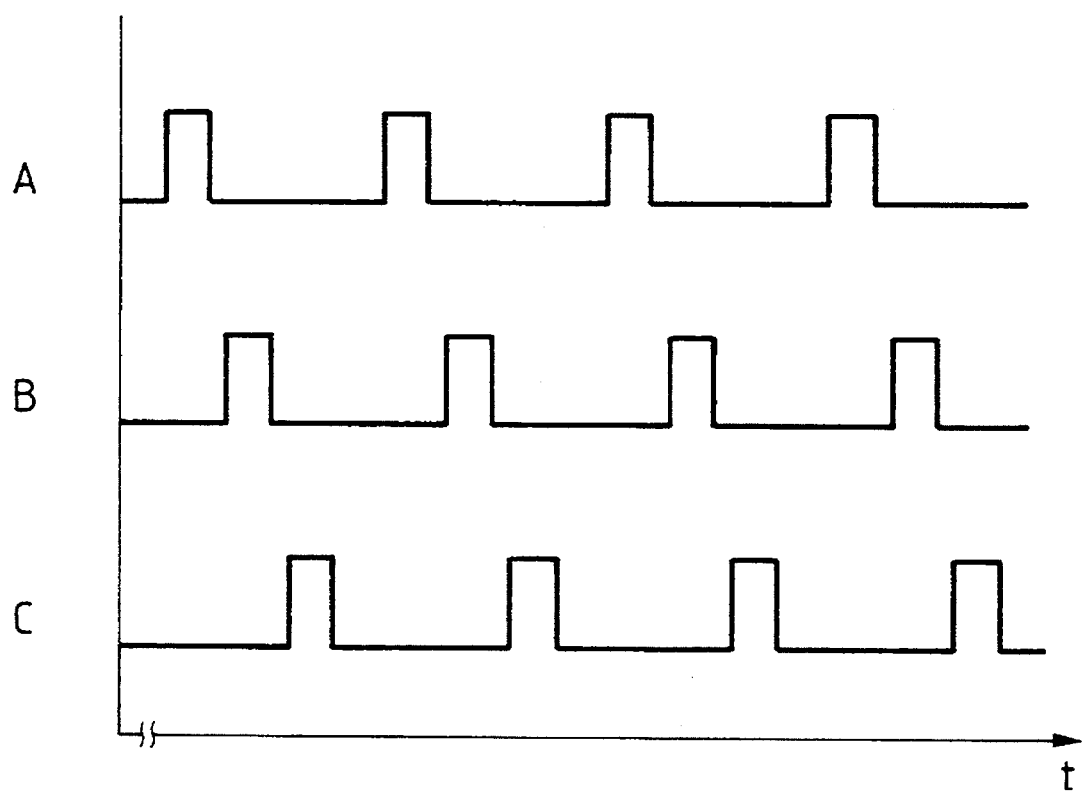
FIG. 25 is a diagram showing signals that are emitted by individual sound generators for transmission according to the first and second embodiments.
Figure 26A:
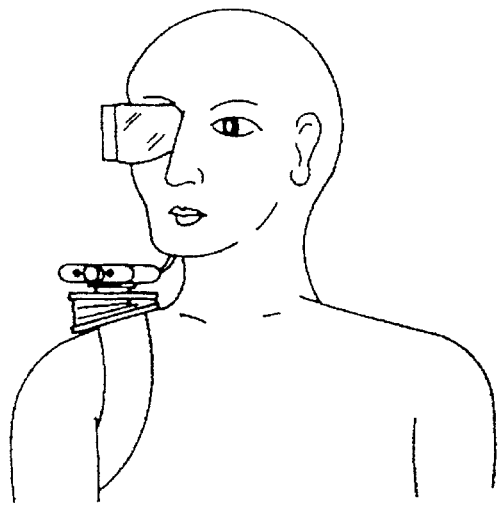
FIGS. 26A through 26D are diagrams illustrating how the view field of the camera corresponds to the field of the independent viewfinder according to the first and second embodiments.
Figure 26B:
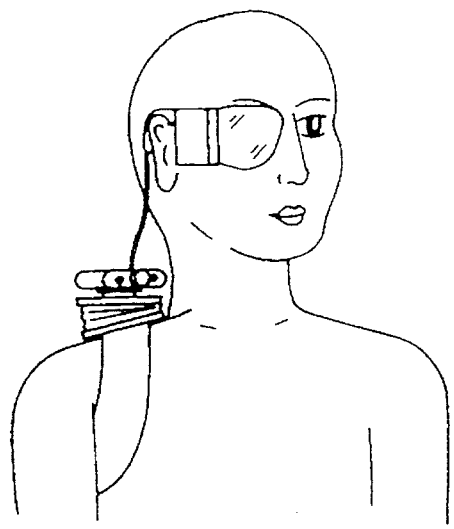
Figure 26D:
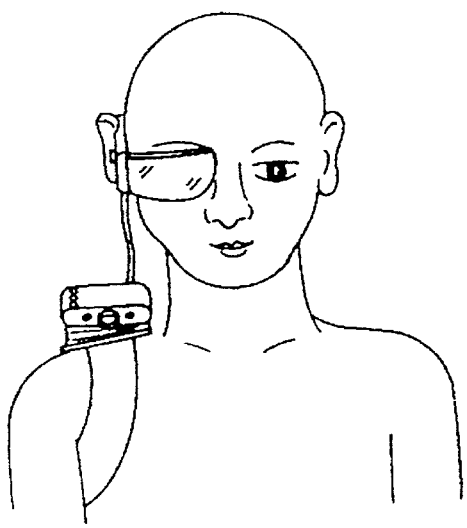
Figure 26C:
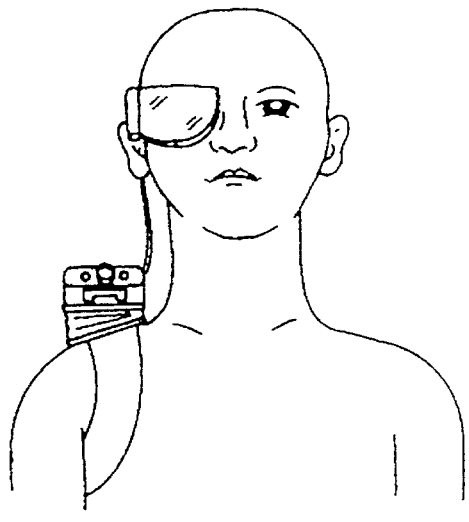

Drive signals are sent from ports $P_e$, $P_f$, and $P_g$ to the respective transmission amplifiers 59, 60, and 61 of the independent viewfinder 10 (step 111). As is shown in FIG. 25, the sound generators 17, 18, and 19 output sonic waves that have the same frequency at alternate time intervals, as represented by A, B, C, respectively, so that they do not to overlap each other (time-sharing control). At the same time, the camera CPU 51 outputs drive signals, which correspond to the alternate time intervals, via ports $P_k$, $P_i$, and $P_j$ to the receiving amplifiers 55, 56, and 57. The amplifiers 55, 56, and 57 amplify the sound signals that are received by the receptors 7, 8, and 9, which correspond respectively to the sound generators 17, 18, and 19. The camera CPU 51 receives the amplified signals via ports $P_h$, $P_i$, and $P_j$. Measurements are made of the time periods that are required for communication between the paired sound generators and receptors, i.e., a communication time ($t_{7c}$) for the paired receptor 7 and sound generator 17, a communication time ($t_{8c}$) for the paired receptor 8 and sound generator 18, and a communication time ($t_{9c}$) for the paired receptor 9 and sound generator 19.

At step 112 are stored, as information that was obtained when matching the view field of the camera body 1 and the view field of the independent viewfinder 10, the distance $D_0$ between the camera body 1 and the white wall 116 acquired at step 109, the initial inclination angle $\theta_0$ calculated by the voltage value of the inclination detector 117 at step 109.5, and the communication times $t_{7c}$, $t_{8c}$, and $t_{9c}$ measured at step 111. The ratio $t_{7c}/t_{9c}$ is also stored.

At step 113, to inform the photographer of the termination of the view field calibration, a signal for turning on the blinking finder light 11 is sent from port $P_a$ to the finder lighting driver 58 of the independent viewfinder 10, and the finder light 11 is turned on.

If, at step 108, it is found that a set signal for the view field calibration switch 22 is not transmitted from the remote controller 20 until the count expiration since the counting is begun by a timer (not shown), i.e., within a predetermined period of time, it is assumed that the photographer does not intend to perform view field calibration. Program control therefore moves to step 114 as described above.

At step 114, to save on electricity, an OFF signal is sent from port $P_b$ to the view field index illuminator driver 52 to turn off the four camera view field index illuminators 6 that are no longer necessary. Then, program control returns to step 102 again, and the same process is repeated.

When, at step 113, the finder light is turned on, program control advances to step 115.

At step 115, as well as at step 105, to determine whether or not the camera that is mounted on the photographer's shoulder is not inclined and is positioned horizontally, a command signal is sent from port $P_k$ of the camera CPU 51 to port $P_s$ of the universal head CPU 71 to check the condition of the posture detection switch.

As previously described, upon receipt of the command signal, the universal head CPU 71 receives the signals indicating the conditions of the elements 92 through 99 from ports $P_1$ through $P_8$. If signals indicating that the elements 92 through 99 are turned ON are not input at ports $P_1$ through $P_8$, the universal head CPU 71 determines that the camera body 1 is horizontally positioned and transmits this result to the camera CPU 51. If any of the elements 92 through 99 is turned ON, the universal head CPU 71 determines the direction in which the camera is inclined by referring to an element of the elements 92 through 99, that is ON, and transmits to the camera CPU 51 a signal indicating that the camera body 1 is not horizontal.

At step 115.5, as well as at step 105.5, a check is performed to determine whether or not the position of the camera body 1 is horizontal. When the position of the camera body 1 is horizontal, program control advances to step 117. When the position of the camera body 1 is not horizontal, program control moves to step 116.

Then, at step 116, as well as at step 106, a command signal is sent to the universal head CPU 71 to direct the horizontal positioning of the camera body 1. Program control thereafter returns to step 115.5. Thus, the universal head CPU 71 properly drives the motors 32 and 37 to position the camera body 1 horizontally.

When the universal head CPU 71 issues a signal to the effect that the camera body 1 is positioned horizontally, and that is confirmed at step 115.5, program control moves to step 117, as described above to prepare to take photographs.

At step 117, a check is performed to determine whether or not the current communication times for the individual pairs are different from the communication times $t_{7c}$, $t_{8c}$, and $t_{9c}$, for the signal transmitter and receptor pairs, that were stored during the view field calibration. When the communication times have been changed within a predetermined time, it is determined that a view field has moved, and program control moves to step 118. When the communication times have not been changed within the predetermined time, it is determined that a view field has not moved, and program control moves to step 119.

Now, with the supposition that a view field has moved, program control goes to step 118 where the subroutine for "3-dimensionally linked driving" is performed.

At step 118, the camera CPU 51 instructs, a signal from port $P_k$ to port $P_s$ of the universal head CPU 71, that the ratio of the changed communication period for each signal transmitter/receptor pair, $t_7/t_9$, should constantly equal the ratio $t_{7c}/t_{9c}$, which is stored during the view field calibration. Program control then returns to step 117.

The universal head CPU 71 outputs a drive signal for the motor 76 to the driver 72 via port $P_l$ and a drive signal for the motor 77 to the driver 73 via port $P_m$, so that the motors 76 and 77 are properly driven. In this manner, as though a 3-dimensionally linked mechanism were provided between the camera body 1 and the independent viewfinder 10, the camera body 1 is operated so that it follows and constantly matches the view field of the camera body 1 with the view field of the independent viewfinder 10.

Figure 27:
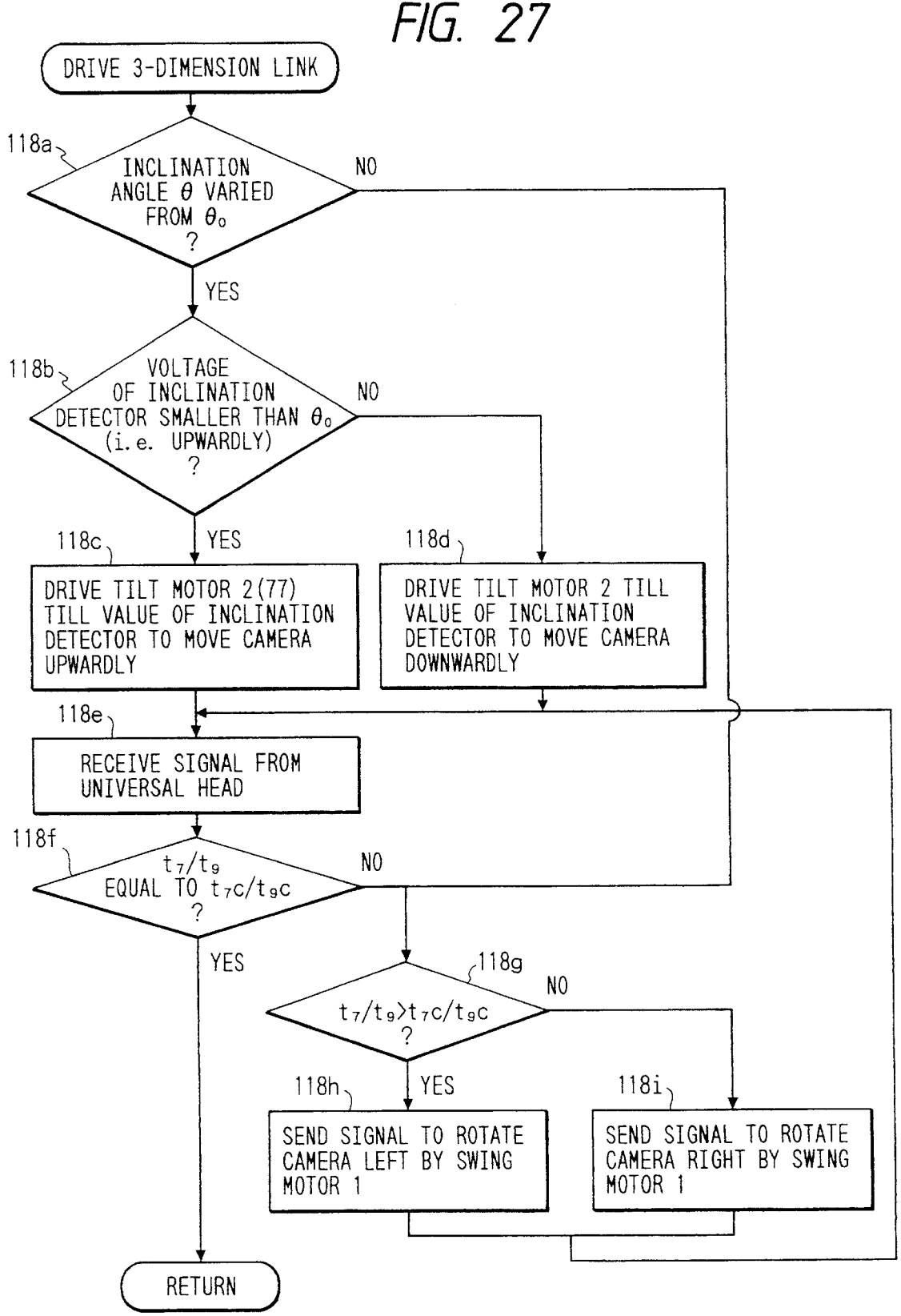
FIG. 27 is a flowchart showing the detailed processing for driving a 3-dimension link at step 118 in FIG. 18.
Figure 28:
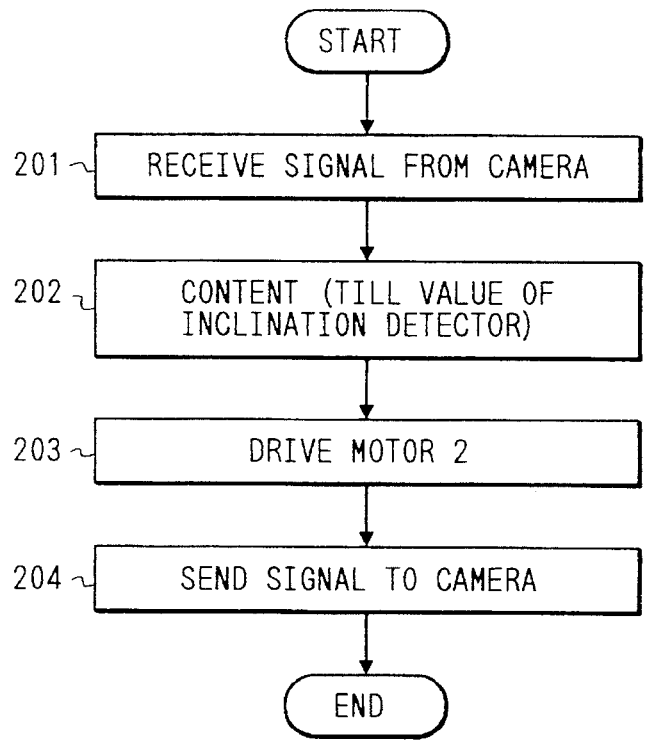
FIG. 28 is a flowchart showing the processing performed by the universal head CPU based on a signal that is transmitted at steps 118c and 118d in FIG. 18.
Figure 29:
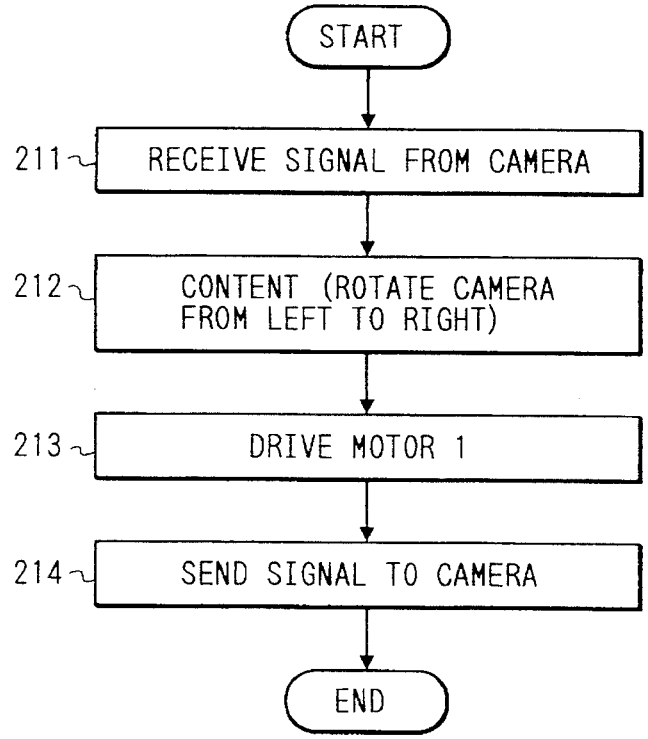
FIG. 29 is a flowchart showing the processing performed by the universal head CPU based on a signal that is transmitted at steps 118h and 118i in FIG. 17.

The subroutine for the "3-dimensionally linked driving" will now be explained in detail while referring to the flowchart in FIG. 27, and the accompanying processing for the universal head CPU 71 will also be explained while referring to the flowcharts in FIGS. 28 and 29.

First, the processing performed by the camera CPU 51 will now be described while referring to FIG. 27.

A check is performed at step 118a to determine whether or not the value of a voltage that is input to port $P_l$ from the inclination detector 117 is different from the voltage value (which is equivalent to the inclination angle $\theta_0$) that is stored during the view field calibration. If the input voltage value is different from the stored value, program control advances to step 118b. If the input voltage value is not different, program control moves to step 118g.

At step 118b, a check is performed to determine whether or not the value of the voltage that is input to port $P_l$ from the inclination detector is smaller than the voltage value (which is equivalent to the inclination angle $\theta_0$) that is stored during the view field calibration (whether or not the independent viewfinder 10 is directed upward). If the input voltage value is smaller than the stored one, program control advances to step 118c. If not, program control moves to step 118d.

At step 118c, a signal is transmitted to the universal head CPU 71, indicating that the tilt motor 77 should be driven until the upward inclination of the camera body 1 equals a value that is indicated by the inclination detector 117.

At step 118d, a signal is transmitted to the universal head CPU 71, indicating that the tilt motor 77 should be driven until the downward inclination of the camera body 1 equals a value that is indicated by the inclination detector 117.

The processing performed by the universal head CPU 71 in response to the signal at step 118c or 118d will now be described while referring to the flowchart in FIG. 28.

The universal head CPU 71 receives a signal from the camera CPU 51 through port $P_s$ (step 201).

The universal head CPU 71 confirms the communication contents (step 202). In this case, the received contents are the direction and the driving value for the tilt motor 77 until the inclination of the camera body 1 equals a value that is indicated by the inclination detector 117.

A signal that indicates the direction and the driving value for the tilt motor 77 is transmitted via port $P_m$ to the driver 73 and the motor 77 is driven as directed (step 203).

The view field of the independent viewfinder 10 and the view field of the camera body 1 are matched.

A signal indicating that the motor 77 has been driven in consonance with a predetermined value is sent to the camera CPU 51 (step 204).

After the processing at steps 118c or 118d is terminated, the camera CPU 51 performs the process at step 118e.

At step 118e, the camera CPU 51 receives from the universal head CPU 71 a signal indicating that the motor 77 has been driven in consonance with the predetermined value, which is acquired at step 118c or 118d. Program control then advances to step 118f.

A check is again performed at step 118f to determine whether or not the current ratio for the communication times, $t_7/t_9$, for each transmitter/receptor pair is equal to the ratio for the communication time for the pair that is stored during the view field calibration. If the current rate is equal to the stored rate, program control returns from the subroutine to step 117 again. If the current rate is not equal to the stored rate, program control branches to step 118g.

At step 118g, the current communication ratio $t_7/t_9$ is compared with the ratio $t_{7c}/t_{9c}$ acquired during the view field calibration. When "$t_7/t_9 > t_{7c}/t_{9c}$", it is determined that the independent viewfinder 10 (or the photographer) is directed to the left, and program control advances to step 118h. For the other cases, it is determined that the independent viewfinder 10 is directed to the right, and program control moves to step 118i.

At step 118h, a signal is sent to the universal head CPU 71 to drive the swing motor 76 in consonance with a predetermined value so as to aim the camera body 1 to the left. Program control then returns to step 118e.

At step 118*i*, a signal is sent to the universal head CPU 71 to drive the swing motor 76 in consonance with a predetermined value so as to aim the camera body 1 to the right. Program control then returns to step 118*e*.

The operation performed by the universal head CPU 71 in response to a signal transmitted at step 118*h* or 118*i* will now be described while referring to the flowchart in FIG. 29.

The universal head CPU 71 receives a signal from the camera CPU 51 through port $P_s$ (step 211).

The universal head CPU 71 confirms the communication contents (step 212). In this case, the received contents are the direction and the driving value for the swing motor 76 to turn the camera body 1 to the right or to the left.

A signal that indicates the direction and the driving value for the swing motor 76 is transmitted to the driver 72 via port $P_l$, and the motor 76 is driven as directed (step 213).

The view field of the camera body 1 is matched with the view field of the independent viewfinder 10 in either the right or the left direction.

A signal indicating that the motor 76 has been driven in consonance with a predetermined value is sent to the camera CPU 51 (step 214).

After the processing at steps 118*h* or 118*i* is terminated, the camera CPU 51 performs the process at step 118*e*, and receives from the universal head CPU 71 a signal that the motor 76 has been driven in consonance with the predetermined value acquired at step 118*h* or 118*i*. Then, program control goes to step 118*f* again, and the above described process is repeated.

Referring again to FIG. 18, the processing at step 119 and at the following steps will now be described.

A check is performed to determine whether or not the SW1 and SW2 signals are input from the remote controller 20 at port $P_c$ of the camera CPU 51 within a predetermined time (step 119). When either the SW1 or the SW2 is received within that period of time, program control advances to step 120. When neither of them is input, program control returns to step 117 and the previously described process is repeated.

At step 120, to save on electricity, driving halt signals are transmitted via ports $P_e$, $P_f$, and $P_g$ to the transmission amplifiers 59, 60, and 61 of the independent viewfinder 10, and sound generation by the sound generators 17, 18, 19 is halted. Simultaneously, driving halt signals are sent via ports $P_h$, $P_i$, and $P_j$ to the reception amplifiers 55, 56, and 57, and reception by the receptors 7, 8, and 9 is halted.

Subsequently, a distance measuring signal is output via port $P_d$ to the distance measuring means 54, and distance measuring information which is in turn input from the distance measuring means 54 is employed to calculate the distance D between the camera body 1 and a target (step 121).

The distance D that is acquired at step 121 is compared with the reference distance $D_0$, which is acquired at step 109 during the view field calibration, to determine whether or not "D=$D_0$" (step 122). If D=$D_0$, there is almost no parallax between the view field of the camera body 1 and the view field of the independent viewfinder 10. It is therefore assumed that no correction is required, and program control advances to step 124. If D≠$D_0$, a parallax has occurred. It is therefore assumed that the parallax correction is required, and program control moves to step 123 to execute the subroutine for "parallax correction."

In this case, on the supposition that D≠$D_0$ and the parallax correction is required, program control moves to step 123.

Based on the referential distance $D_0$ acquired during the view field calibration, the angle φ that is formed by the axis of the lens of the camera body 1 and the axis of the finder lens and that is acquired by using the communication times $t_{7c}$, $t_{8c}$, and $t_{9c}$ of the transmitter/receptor pairs, and the distance $L_{8c}$ between the axis of the lens of the camera body 1 and the axis of the finder of the independent viewfinder 10 (see FIG. 23), the known finder parallax correction value in consonance with the distance D is calculated as is subsequently described, and the obtained result is output from port $P_k$ to port $P_s$ of the universal head CPU 71.

In response to the receipt of the result, the universal head CPU 71 sends a drive signal for the swing motor 76 to the driver 72 via port $P_l$ and a drive signal for the tilt motor 77 to the driver 73 via port $P_m$, so that the motors 76 and 77 are properly driven so as to perform the finder parallax correction.

Figure 30:
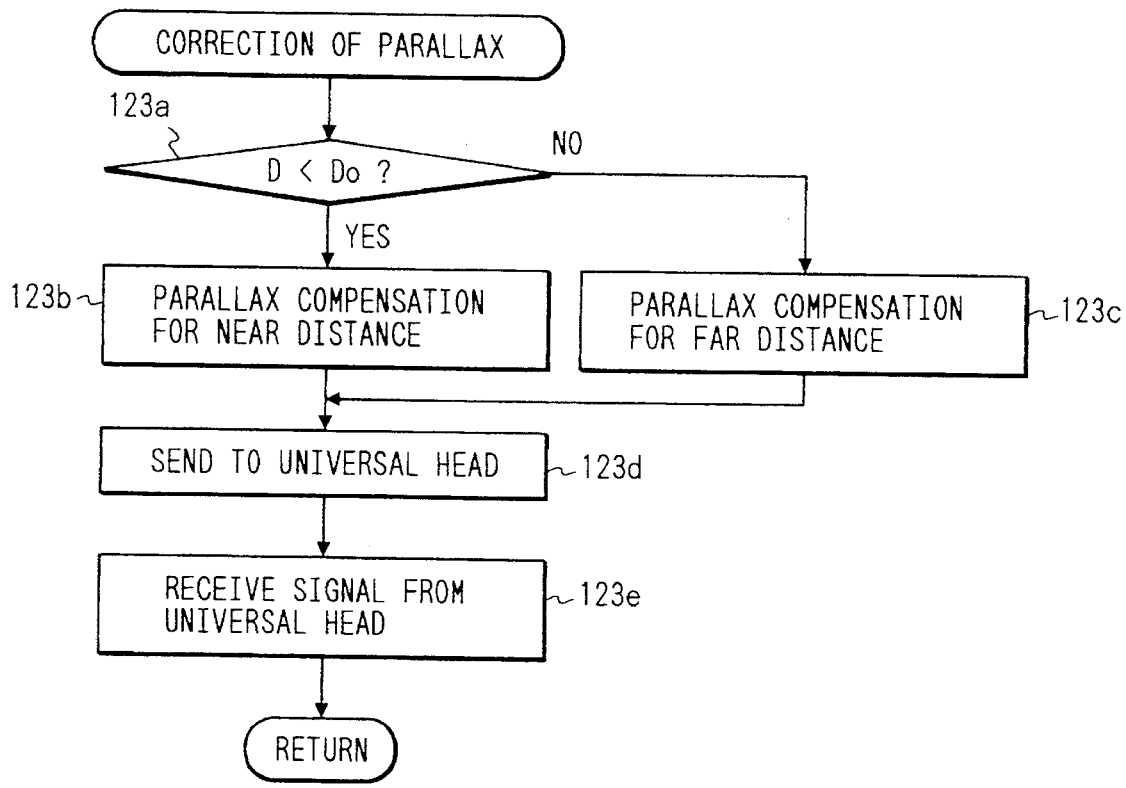
FIG. 30 is a flowchart showing the detailed processing for parallax correction at step 123 in FIG. 18.
Figure 31:
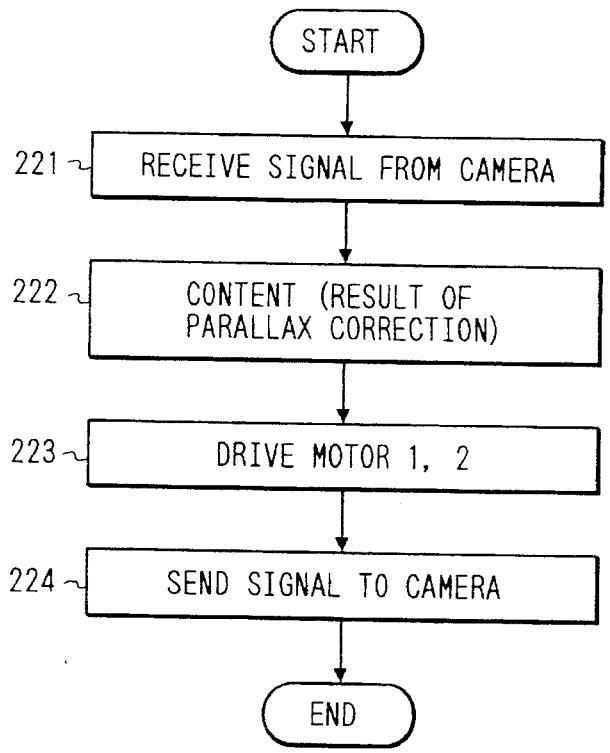
FIG. 31 is a flowchart showing the processing performed by the universal head CPU based on a signal that is transmitted at step 123d in FIG. 30.

The subroutine for the "parallax correction" at step 123 will now be explained in detail while referring to the flowchart in FIG. 30, and the accompanying processing performed by the universal head CPU 71 will also be described while referring to FIG. 31.

First, the operation of the camera CPU 51 will be described while referring to FIG. 30.

A check is performed to determine whether or not the reference distance $D_0$, acquired at step 109 during the view field calibration, is greater than the distance D acquired at step 121 (step 123*a*). If the distance $D_0$ is greater than the distance D, program control advances to step 123*b*. If not, program control moves to step 123*c*.

Although the correction of parallax is performed at step 123*b* or 123*c*, for easy explanation, the correction is to be conducted under the conditions as follows.

* A target moves forward or backward in front of a photographer during this process and also during the view field calibration.

Figure 32A:
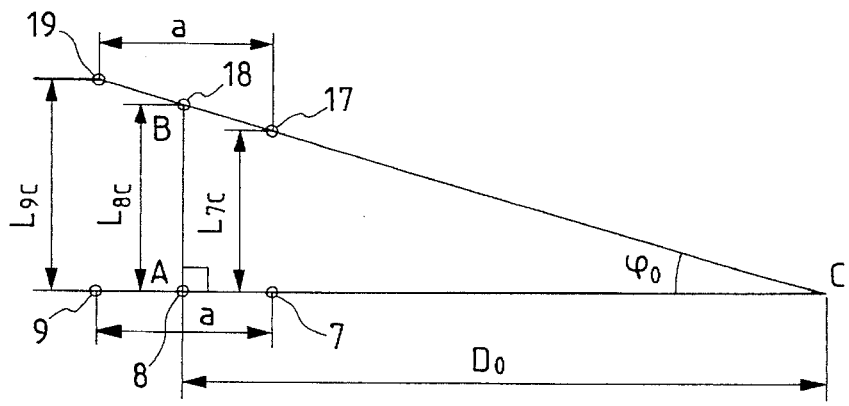
FIGS. 32A through 32C are diagrams for explaining the idea for calculating the parallax correction that is performed in the processing in FIG. 30.
Figure 32B:
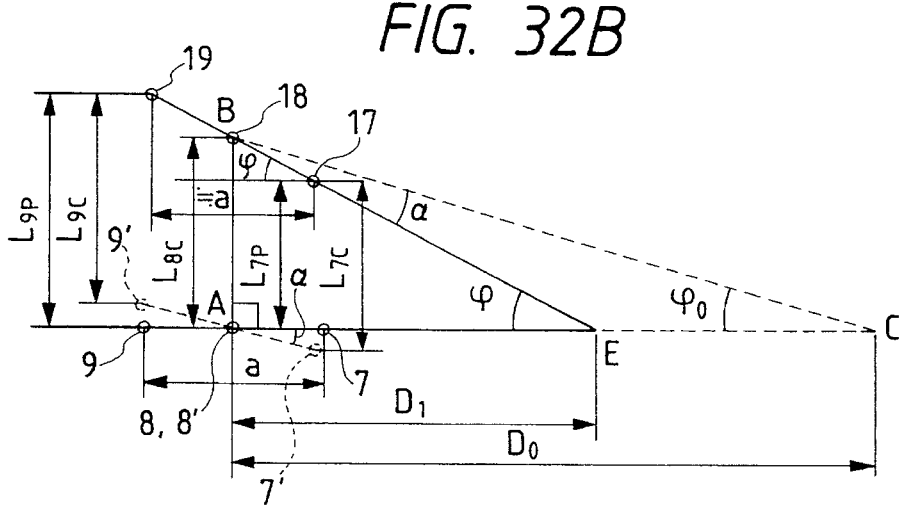
Figure 32C:
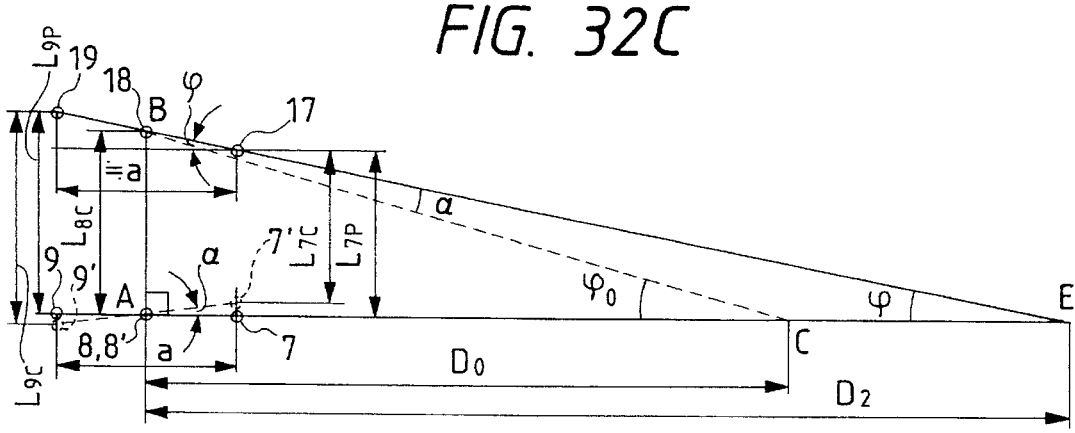

* As is shown in FIGS. 32A through 32C, one pair comprising a transmitter of the independent viewfinder 10 and a receptor of the camera body 1 (the paired sound generator 18 and receptor 8 in this case) matches the reference distance position to form a right triangle ABC, and the pivot positions of the camera body 1 and the independent viewfinder 10 are matched with the positions of the transmitter and the receptor (18 and 8). It is presumed that there is almost no change in the distance $L_{8c}$ for the transmitter/receptor pair (18 and 8).

The target distance D is much greater than the distance $L_{8c}$ for the transmitter/receptor pair (18 and 8).

Suppose that the horizontal distance, as is shown in FIG. 32A, of the transmitter/receptor pair in, respectively, the independent viewfinder 10 and the camera body 1 (17 and 7, or 19 and 9) during the view field calibration is a.

First, the geometrical relationship between the camera system and a target, during the view field calibration, that is stored at step 112 will be described while referring to FIG. 32A.

In FIG. 32A, $D_0$ denotes a referential distance that is predetermined for the view field calibration; and $φ_0$ denotes an angle, formed by the axis of the camera lens and the axis of the finder, that is obtained by arranging in a line distances $L_{7c}$, $L_{8c}$, and $L_{9c}$ for the transmitter/receptor pairs, which are acquired by calculating the communication times $t_{7c}$, $t_{8c}$, and $t_{9c}$ for these pairs. Their relationships are expressed below:

$$\tan φ_0 = (L_{9c} - L_{7c})/a \quad (1)$$
$$= L_{8c}/D.$$

(Parallax correction for a short distance)

When the target is located at the distance $D_1$, which is shorter than the referential distance $D_0$, the photographer looks at the target through the independent viewfinder 10 and, as is shown in FIG. 32B, the series of sound generators 17 through 19 of the independent viewfinder 10 is shifted by an angle $\alpha$ from the acquired direction at the time of the view field calibration in FIG. 32A.

Without the parallax correction, since the distances of the transmitter/receptor pairs $L_{7c}$, $L_{8c}$, and $L_{9c}$ are maintained, the series of the receptors of the camera body 1 is shifted by almost the angle $\alpha$, and accordingly is arranged as indicated by the dotted line described by 7', 8' and 9', as is shown in 32B. The field of the camera body 1 is then slightly different from the finder field.

The direction of the camera body 1 is therefore corrected so as to satisfy the subsequent relationships.

Supposing that the right triangle that involves the sound generators 17 through 19 of the independent viewfinder 10 and the right triangle ABE are employed and $\angle$ AEB is $\phi$, $$\tan \phi = (L_{9p} - L_{7p})/a \quad (2)$$
$$= L_{8c}/D_1$$

$$\therefore L_{9p} - L_{7p} = a \cdot L_{8c}/D_1, \quad (3)$$

wherein $L_{9p}$ and $L_{7p}$ are the distances between the transmitter/receptor pairs (17 and 7, and 19 and 9) after the parallax correction is performed.

Supposing that the direction of the camera body 1 is to be corrected by angle $\alpha$, referring to the triangle BCE, $$\alpha = 180° - \phi_0 - (180° - \phi) \quad (4)$$
$$= \phi - \phi_0.$$

By employing the expression (1), $\phi_0$ is represented as:

$$\phi_0 = \tan^{-1}(L_{8c}/D_0) \quad (5),$$

and by employing the expression (2), $\phi$ is represented as:

$$\phi = \tan^{-1}(L_{8c}/D_1) \quad (6).$$

Thus, by employing the expressions (5) and (6), the expression (4) can be:

$$\alpha = \tan^{-1}(L_{8c}/D_1) - \tan^{-1}(L_{8c}/D_0) \quad (7).$$

(Parallax correction for a long distance)

When a target is located at the distance $D_2$, which is greater than the referential distance $D_0$, the positioning of the sound generators 17 through 19 is as is shown in FIG. 32C. The distance of the transmitter/receptor pair (17 and 7, or 9 and 19) is represented in the same manner as was done for the short distance:

$$\therefore L_{9p} - L_{7p} = aL_{8c}/D_2 \quad (8).$$

The correction in the direction of the camera body 1 by angle $\alpha$ is represented as follows.

$$\alpha = \tan^{-1}(L_{8c}/D_0) - \tan^{-1}(L_{8c}/D_2) \quad (9).$$

For the distance D of the target, by employing the distances between the transmitter/receptor pairs (17 and 7, and 19 and 9), $$\therefore L_{9p} - L_{7p} = aL_{8c}/D \quad (10).$$

The angle $\alpha$ is represented as follows:

$$\alpha = |\tan^{-1}(L_{8c}/D) - \tan^{-1}(L_{8c}/D_2)| \quad (11).$$

At step 123b or 123c, based on the result of the parallax correction, the camera CPU 51 transmits signals to the universal head CPU 71 to drive the motors 76 and 77.

At step 123d, based on the result of the parallax correction, the camera CPU 51 transmits to the universal head CPU 71 signals indicating the direction and a driving value for the motors 76 and 77.

At step 123e, the camera CPU 51 waits for a signal from the universal head CPU 71 indicating that, according to the instruction from the camera CPU 51, the motor 76 and 77 have been driven in consonance with the predetermined value based on the parallax correction results. When the camera CPU 51 receives the signal, program control goes to step 124 in FIG. 18.

The processing performed by the universal head CPU 71 that receives a signal transmitted at step 123d will now be described while referring to the flowchart in FIG. 31.

The universal head CPU 71 receives a signal from the camera CPU 51 via port $P_s$ (step 221).

The universal head CPU 71 confirms the communication contents (step 222). In this case, the received contents are the direction and the driving value for the motors 76 and 77 that are based on the parallax correction results.

Then, signals that indicate the directions and the driving values for the swing motor 76 and the tilt motor 77 are transmitted respectively via port $P_l$ and port $P_m$ to the drivers 72 and 73, and the motors 76 and 77 are driven (step 223).

In this manner the parallax of the view field of the camera body 1 and the view field of the independent viewfinder 10 is almost eliminated.

At step 224, signals indicating that the motors 76 and 77 have been driven in consonance with the predetermined values are sent to the camera CPU 51.

Referring back to FIG. 18, after the processing at step 123e is terminated, the camera CPU 51 performs the process at step 124.

A check is performed at step 124 to determine whether or not the SW2 signal from the remote controller 20 is received at port $P_c$ within a predetermined time. If the SW2 signal is input, program control moves to step 125. If the SW2 signal is not input, program control moves to step 126.

At step 125, the focusing of the lens is performed based on the previously described distance measuring result. An aperture value and a shutter second, which are obtained based on a light measurement result acquired by a light measuring means (not shown), are employed to drive an aperture and a shutter (neither of them shown), and a film is exposed to light. After the shutter is released, a charge motor (not shown) is driven to wind the film, and to set the aperture and the shutter to their initial states.

As described above, when the SW2 signal has not been input by the remote controller 20 within the predetermined time, program control goes to step 126.

At step 126, the process as performed at step 111 is repeated and program control returns to step 115.

After the film is exposed to light at step 125, at step 127 a check is performed by examining the state of the power switch to determine whether or not the filming is to be continued. If the power is still on, program control moves to step 126 for the following photographing. If the power is turned off, program control goes to step 128.

The processing series is then terminated at step 128.

Figure 33A:
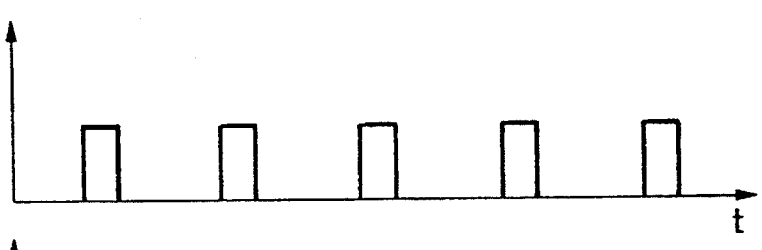
FIGS. 33(a) to (c) are diagrams showing the signals that are emitted by individual sound generators for transmission according to a third embodiment of the present invention.
Figure 33B:
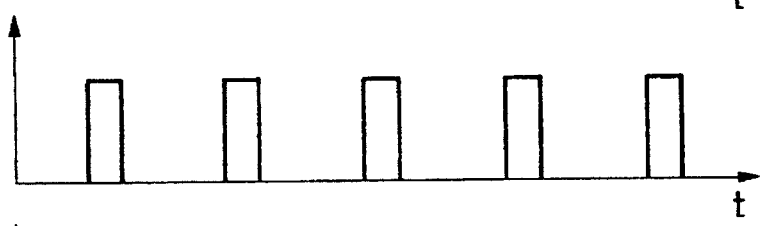
Figure 33C:
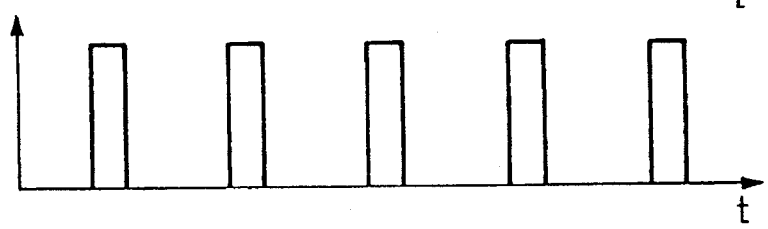

FIGS. 33(a) to (c) are diagrams illustrating signals that are sent from sound generators 17, 18, and 19 according to a third embodiment of the present invention.

While, as is shown in FIG. 25, the sound generators 17, 18, and 19 send signals in a time-sharing manner in the second embodiment, the sound generators 17, 18, and 19 in this embodiment simultaneously transmit sonic waves at different frequencies, as is shown by A', B', and C', to corresponding receptors 7, 8, and 9 (frequency dividing).

The other arrangements and processing are the same as those in the second embodiment.

Although in the description of the above embodiments it is mainly mask information that has been displayed in a viewfinder as a field frame, other AF distance measuring marks, display of a focused position, or a mode display may be employed.

Further, if the mask serves as an LCD, the camera body serves as a video camera, and wiring between them or communication is performed, instead of the field frame, a monitor screen can be seen in the view field. The present invention includes all these types of camera systems.

Although the position adjustment of the stepping motor has been described as an open control, it would be obvious for one having ordinary skill in the art to obtain considerable improvement in control reliability by providing position detection switches at proper places.

For photographing while using the camera system in the embodiments, the angle at which the photographer swings or tilts his head can be ±20° for up and down, and ±20° to either side for follow up shifting (if the photographer does not momentarily move his head by a large angle, such as 40°).

In addition, in the above described embodiments the ratio $(t_{7c}/t_{9c})$ of the communication times for two pairs provided at the ends, among, for example, three transmitter/receptor pairs, is stored during the view field calibration. Then, the direction of the camera is shifted to follow up the direction of the independent viewfinder, so that the ratio $(t_7/t_9)$, of the communication time when the direction of the independent viewfinder is changed, constantly matches (approaches) the ratio $t_{7c}/t_{9c}$, which is employed as a reference. However, the direction of the camera may be shifted to match the direction of the independent viewfinder so as to reduce as much as possible a difference between the communication time of each transmitter/receptor pair, which is stored during the view field calibration and is employed as a reference, and the communication time for the corresponding transmitter/receptor pair when the direction of the independent viewfinder is changed.

Instead of attaching them to the shoulder, the camera and the electric universal head may be located a little apart from a photographer, such as on a tripod or on a table.

Although the sound generators are provided in the independent viewfinder, and the corresponding receptors are mounted in the camera body, these components can be interchangeably installed.

Further, although the viewfinder transmits a signal to the camera body using the sound generators, other transmission methods may be employed.

Moreover, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Also, the individual components shown in schematic or block form in the Drawings are all well-known in the camera arts and their specific construction and operation are not critical to the operation or the best mode for carrying out the invention.

The present invention may employ a combination of the above described embodiments or technical elements as needed.

Further, the present invention may be employed as one wherein the entire arrangement, or a partial arrangement, cited in the claims or the embodiments, forms one device, one wherein the arrangement is coupled with another device, or one wherein the arrangement is a constituent of another device.

The present invention is also applicable for a variety of camera types, such as single-lens reflex cameras, lens shutter cameras, and video cameras; optical equipment other than cameras and other apparatuses; and devices that can be employed for cameras, for optical equipment, or for other apparatuses, and as constituents of these devices.

What is claimed is:

1. An apparatus adapted for use with a camera including a camera body and an independent optical viewfinder, the apparatus comprising:

a following device that drives a photographing field of the camera body to follow a viewfinder field of the optical viewfinder.

2. An apparatus according to claim 1, wherein said following device comprises transmission means for transmitting a signal from the optical viewfinder to the camera body.

3. An apparatus according to claim 2, wherein said following device comprises means for changing a photographing direction of the camera body in accordance with the signal transmitted by the transmission means.

4. An apparatus according to claim 1, wherein said following device comprises means for adjusting a linkage manner between the optical viewfinder and the camera body.

5. An apparatus according to claim 1, further comprising changing means for changing the optical viewfinder into either an in-use state or a not-in-use state.

6. An apparatus according to claim 5, wherein the changing means comprises a motor.

7. An apparatus according to claim 5, wherein the changing means comprises diopter adjustment means for performing a diopter adjustment of the optical viewfinder.

8. An apparatus according to claim 7, wherein the diopter adjustment means comprises means for storing a diopter adjustment state.

9. A viewfinder apparatus adapted to a camera, comprising:

an optical viewfinder provided separately from a camera body; and a following device that drives a photographic field of the camera body so as to follow a viewfinder field of the optical viewfinder.

10. An apparatus according to claim 9, wherein said following device comprises transmission means for transmitting a signal from said optical viewfinder to the camera body.

11. An apparatus according to claim 10, wherein said following device comprises means for changing a photographing direction of the camera body in accordance with the signal transmitted by the transmission means.

12. An apparatus according to claim 9, wherein said following device comprises means for adjusting a linkage manner between said optical viewfinder and the camera body.

13. An apparatus according to claim 9, further comprising changing means for changing said optical viewfinder into either an in-use state or a not-in-use state.

14. An apparatus according to claim 13, wherein the changing means comprises a motor.

15. An apparatus according to claim 13, wherein the changing means comprises diopter adjustment means for performing a diopter adjustment of said optical viewfinder.

16. An apparatus according to claim 15, wherein the diopter adjustment means comprises means for storing a diopter adjustment state.

17. A viewfinder apparatus adapted to a camera, comprising:

a viewfinder field portion; and a movement device that moves said viewfinder portion between an in-use state and a not-in-use state.

18. An apparatus according to claim 17, wherein said movement device comprises a motor.

19. An apparatus according to claim 17, wherein said movement device comprises diopter adjustment means for performing a diopter adjustment of the viewfinder apparatus.

20. An apparatus according to claim 19, wherein the diopter adjustment means comprises means for storing a diopter adjustment state.

21. A camera comprising:

a camera body;

an optical viewfinder provided separately from said camera body; and a following device that drives a photographic field of the camera body so as to follow a viewfinder field of said optical viewfinder.

22. A camera according to claim 21, wherein said following device comprises transmission means for transmitting a signal from said optical viewfinder to the camera body.

23. A camera according to claim 22, wherein said following device comprises means for changing a photographing direction of the camera body in accordance with the signal transmitted by the transmission means.

24. A camera according to claim 21, wherein said following device comprises means for adjusting a linkage manner between said optical viewfinder and the camera body.

25. A camera according to claim 21, further comprising changing means for changing said optical viewfinder either to an in-use state or a not-in-use state.

26. A camera according to claim 25, wherein the changing means comprises a motor.

27. A camera according to claim 25, wherein the changing means comprises diopter adjustment means for performing a diopter adjustment of said optical viewfinder.

28. A camera according to claim 27, wherein the diopter adjustment means comprises means for storing a diopter adjustment state.

29. A camera to which an optical viewfinder is adapted, the optical viewfinder being provided separately from a camera body, the camera comprising:

a following device that drives a photographic field of the camera body so as to follow a viewfinder field of the optical viewfinder.

30. A camera according to claim 29, wherein said following device comprises transmission means for transmitting a signal from the optical viewfinder to the camera body.

31. A camera according to claim 30, wherein said following device comprises means for changing a photographing direction of the camera body in accordance with the signal transmitted by the transmission means.

32. A camera according to claim 29, wherein said following device comprises means for adjusting a linkage manner between the optical viewfinder and the camera body.

33. A camera according to claim 29, further comprising changing means for changing the optical viewfinder between an in-use state and a not-in-use state.

34. A camera according to claim 33, wherein the changing means comprises a motor.

35. A camera according to claim 33, wherein the changing means comprises diopter adjustment means for performing a diopter adjustment of the optical viewfinder.

36. A camera according to claim 35, wherein the diopter adjustment means comprises means for storing a diopter adjustment state.

* * * * *

UNITED STATES PATENT AND TRADEMARK OFFICE
CERTIFICATE OF CORRECTION

PATENT NO. : 5,610,678
DATED : March 11, 1997
INVENTOR(S) : TAKAYUKI TSUBOI, ET AL.

It is certified that error appears in the above-identified patent and that said Letters Patent is hereby corrected as shown below:

COLUMN 1

Line 48, "monitor TV." should read --TV monitor--.

COLUMN 3

Line 5, "cross sectional" should read --cross-sectional--.
Line 8, "cross sectional" should read --cross-sectional--.
Line 11, "cross sectional" should read --cross-sectional--.

COLUMN 11

Line 14, "them" should read --them from--.

UNITED STATES PATENT AND TRADEMARK OFFICE
CERTIFICATE OF CORRECTION

PATENT NO. : 5,610,678
DATED : March 11, 1997
INVENTOR(S) : TAKAYUKI TSUBOI, ET AL.

It is certified that error appears in the above-identified patent and that said Letters Patent is hereby corrected as shown below:

COLUMN 20

Line 13, "to" should be deleted.

COLUMN 27

Line 64, "well-known" should read --well known--.

Signed and Sealed this

Seventh Day of October, 1997

Attest:

BRUCE LEHMAN

Attesting Officer

Commissioner of Patents and Trademarks